United States Patent [19]

Abraham

[11] Patent Number: 5,231,143
[45] Date of Patent: * Jul. 27, 1993

[54] HIGH-TEMPERATURE OIL-RESISTANT ELASTOMERS

[75] Inventor: Tonson Abraham, Elyria, Ohio

[73] Assignee: The B. F. Goodrich Company, Akron, Ohio

[*] Notice: The portion of the term of this patent subsequent to Feb. 19, 2008 has been disclaimed.

[21] Appl. No.: 889,661

[22] Filed: May 27, 1992

Related U.S. Application Data

[60] Division of Ser. No. 610,773, Nov. 14, 1990, and a continuation-in-part of Ser. No. 450,945, Dec. 14, 1989, Pat. No. 4,999,405, and a continuation-in-part of Ser. No. 450,947, Dec. 14, 1989, Pat. No. 4,994,528, and a continuation-in-part of Ser. No. 450,950, Dec. 14, 1989, Pat. No. 4,994,527.

[51] Int. Cl.$^5$ ............................................. C08F 8/04
[52] U.S. Cl. ................................ 525/326.2; 525/338; 525/339
[58] Field of Search ................................... 525/326.2

[56] References Cited

U.S. PATENT DOCUMENTS

| | | |
|---|---|---|
| 2,836,583 | 5/1958 | Crawford . |
| 2,951,063 | 8/1960 | Bolstad et al. . |
| 2,951,064 | 8/1960 | Lo . |
| 2,951,065 | 8/1960 | Lo . |
| 2,975,164 | 3/1961 | Crawford et al. . |
| 2,979,489 | 4/1961 | Le . |
| 3,218,303 | 11/1965 | Anderson et al. . |
| 3,308,175 | 3/1967 | Barr . |
| 3,379,773 | 4/1968 | Barr . |
| 3,398,128 | 8/1968 | Bolstad et al. . |
| 3,416,899 | 12/1968 | Schiff . |
| 3,531,450 | 9/1970 | Yoshimoto et al. . |
| 3,562,341 | 2/1971 | Tarrant et al. . |
| 3,607,850 | 9/1971 | Smith . |
| 3,625,927 | 12/1971 | Yoshimoto et al. . |
| 3,673,281 | 6/1972 | Bronstert et al. . |
| 3,766,300 | 10/1973 | De La Mare . |
| 3,988,504 | 10/1976 | Halasa . |
| 4,041,229 | 8/1977 | Pattison . |
| 4,098,991 | 4/1978 | Kang . |

FOREIGN PATENT DOCUMENTS 1384143 6/1972 United Kingdom .

OTHER PUBLICATIONS

Chemical Abstracts vol. 68, 1968, pp. 7696-79692n.
"Oil Resistant Rubbers from 2-Methyl Vinyl Pyridine", James E. Pritchard & Milton H. Opheim, Industrial an Engineering Chemistry, 1954, vol. 46, pp. 2242-2245.
"Butadiene-2-Methyl-5-Vinylpyridine Rubbers for General Purpose Use", H. E. Railsbach 7 C. C. Baird, Industrial Engineering Chemistry, 1957, vol. 49, pp. 1043-1050.
"Pyridinium High Polymers—A New Class of Oil-Resistant Synthetic Rubbers", W. B. Reynold, J. E. Pritchard, M. H. Opheim, & G. Kraus, Proceedings of the 3rd Rubber Technology Conference, 1956, pp. 226-240.
"Technical Report 68-56-CM Polymerization Studies Leading to High Strength Chemical-Resistant Elastomers Serviceable at Temperature Extremes", D. I. Relyea, H. P. Smith, A. N. Johnson, Feb. 1968, p. 8.
"Principles of Elastomer Synthesis", H. F. Mark, Journal of Applied Polymer Science: Applied Polymer Symposium 39, 1984, pp. 1-19.

*Primary Examiner*—Bernard Lipman
*Attorney, Agent, or Firm*—Hudak & Shunk

[57] ABSTRACT

High-temperature oil-resistant elastomers are prepared from butadiene alkenylpyridine copolymers, butadiene-acrylate copolymers, and copolymers of butadiene with 1,3-dienes containing fluorine. The unsaturated olefinic backbone and pendant unsaturation derived from the hydrocarbon diene of each of the copolymers is hydrogenated to a high degree by a catalyst which improves the heat resistance of the copolymer without hydrogenation of the polar groups thereof which would lower the oil-resistance of the copolymer. A complexing agent for the hydrogenation catalyst prevents poisoning of the catalyst by the polar groups of the copolymers thereby enabling the catalyst to complex with unsaturated sites along the olefinic copolymer backbone to achieve high levels of hydrogenation thereof.

3 Claims, 13 Drawing Sheets

PMR SPECTRUM
HYDROGENATED BUTADIENE/2-VINYLPYRIDINE COPOLYMER
REFERENCE: TETRAMETHYLSILANE (0.00 PPM)

1,1,2-TRIFLUOROBUTADIENE/BUTADIENE COPOLYMER, (EQUIMOLAR CONTENT OF BOTH MONOMERS IN POLYMER)
$-(CF_2-CF=CH-CH_2)-(CH_2-CH=CH-CH_2)-$
PROTON MAGNETIC RESONANCE IN TETRAHYDROFURAN-$D_8$.
SIGNAL DOCUMENTED AT PARTS PER MILLION FROM THE PROTONS OF TETRAMETHYLSILANE.

HYDROGENATED 1,1,2-TRIFLUOROBUTADIENE/BUTADIENE COPOLYMER. PROTON MAGNETIC RESONANCE SPECTRUM IN TETRAHYDROFURAN-D8. SIGNAL DOCUMENTED AT PARTS PER MILLION FROM THE PROTONS OF TETRAMETHYLSILANE.

HIGH-TEMPERATURE OIL-RESISTANT ELASTOMERS

CROSS-REFERENCE

This is a division of U.S. application Ser. No. 07/610,773, filed on Nov. 14, 1990, of Tonson Abraham, for "High-Temperature, Oil-Resistant Elastomers," which is a continuation-in-part of the following pending prior applications: Ser. No. 07/450,945 filed Dec. 14, 1989, now U.S. Pat. No. 4,999,405 for "Compositions of and a Method for Preparing High-Temperature Oil-Resistant Elastomers from Hydrogenated Butadiene Alkenylpyridine Copolymers"; Ser. No. 07/450,947 filed Dec. 14, 1989 now U.S. Pat. No. 4,994,528 for "Compositions of and a Method for Preparing High-Temperature Oil-Resistant Elastomers from Hydrogenated Butadiene-Acrylate Copolymers"; and Ser. No. 07/450,950 filed Dec. 14, 1989, now U.S. Pat. No. 4,994,527 for "High Temperature, Oil-Resistant Elastomers from Hydrogenated Copolymers of 1,3-Dienes Containing Fluorine."

FIELD OF THE INVENTION

The present invention relates to high-temperature oil-resistant elastomers prepared from butadiene alkenylpyridine copolymers, butadiene acrylate copolymers, and copolymers of butadiene with 1,3-dienes containing fluorine. More particularly, the invention relates to such high-temperature oil-resistant elastomers prepared from the above-mentioned copolymers, wherein the unsaturated olefinic backbone of each of the copolymers as well as the pendant unsaturation derived from the hydrocarbon diene, is hydrogenated to a high degree, which improves the heat resistance of the copolymer without hydrogenation of the polar groups thereof which would lower the oil-resistance of the copolymer.

BACKGROUND

Nitrile-butadiene rubber (NBR) is an oil-resistant elastomer used in automotive applications, but has poor high temperature properties. The recommended continuous use temperature is between 100°-125° C. Commercially available hydrogenated NBR (HNBR) addresses the need for a higher use temperature, oil-resistant elastomer having a continuous use temperature up to about 150° C.

Removal of the backbone unsaturation in NBR by hydrogenation increases the heat resistance of the polymer while maintaining its low temperature and oil-resistant properties. HNBR is mainly a random copolymer of ethylene and acrylonitrile. HNBR compositions that contain up to 40 weight percent bound acrylonitrile and 60 weight percent hydrocarbon segments have high oil resistance and good low temperature properties. Higher acrylonitrile content in the copolymer would further increase oil resistance, but would be detrimental to low temperature properties.

Thus, although NBR can be successfully hydrogenated to form HNBR having desirable thermooxidative stability or high heat-resistance, as well as high oil-resistant properties, NBR must be hydrogenated utilizing a homogeneous rhodium catalyst which is very expensive, thus making the hydrogenated copolymer product economically limiting. The economical and efficient process of the present invention cannot be utilized to hydrogenate NBR since the pendant nitrile groups of the copolymer would hydrogenate, thus lowering oil-resistance and also causing cross-linking of the polymer chains making the copolymer product unsuitable for elastomer applications. Therefore, butadiene-alkenylpyridine copolymers, butadiene-acrylate copolymers, and copolymers of butadienes with 1,3-dienes containing fluorine are hydrogenated using the process of the present invention to produce a high-temperature and oil-resistant elastomer, wherein the unsaturated olefinic backbone of each of the copolymers as well as the pendant unsaturation derived from the hydrocarbon diene, is hydrogenated to a high degree which results in the improved heat-resistance of the copolymer, without hydrogenation of the polar groups thereof thereby maintaining the oil-resistance of the copolymer. Again, these hydrogenated copolymers of the present invention are produced in an economical manner, making them more desirable than the expensive HNBR copolymers.

U.S. Pat. No. 3,416,899 (Schiff, Dec. 17, 1968) relates to improved gel compositions useful as incendiary fuels, as solid fuels for heating, as a fracturing liquid for subterranean formations, and the like. In another aspect, this reference relates to the preparation of hydrocarbon gel compositions by hydrogenating a hydrocarbon solution of an unsaturated rubbery polymer in the presence of a catalyst comprising a reducing metal compound and a salt of a Group VIII metal.

U.S. Pat. No. 3,673,281 (Bronstert et al., Jun. 27, 1972) relates to a process for the hydrogenation of polymers containing double bonds in solution and in the presence of a catalyst complex comprising:

A. a compound of iron, cobalt or nickel,
B. an organo-aluminum compound, and
C. hexaalkylphosphhoric acid triamide as activator.

Polymers of diene hydrocarbons contain double bonds in the backbone. These double bonds may be hydrogenated by conventional processes. Products which are wholly or partly hydrogenated in this way are superior to non-hydrogenated polymers in that they possess improved resistance to aging and are particularly resistant to oxidative degradation. In the case of block copolymers of dienes and vinyl aromatic compounds, in particular, the hydrogenated products also show improved tensile properties and mechanical strength. When only partially hydrogenated, the diene polymers may be vulcanized. Such vulcanizates possess a higher tensile strength and a lower glass temperature than vulcanizates of non-hydrogenated diene polymers.

U.S. Pat. No. 3,625,927 (Yoshimoto et al, Dec. 7, 1971) relates to a catalyst for hydrogenating a high molecular weight polymer having hydrogenatable unsaturated bonds. This catalyst is suitable for hydrogenation of the polymer is a viscous solution form and comprises a reaction product of (1) a metal chelate compound of nickel, cobalt, or iron, with (2) an organic metallic reducing agent in said chelate compound. The chelating agent is attached to the metal by a pair of nitrogen atoms and an oxygen atom.

U.S. Pat. No. 3,531,450 (Yoshimoto et al, Sep. 29, 1970) relates to a new hydrogenation catalyst consisting of three catalytic components and a process for hydrogenating polymers by the use of said catalyst. This three-component catalyst consists of (1) at least one kind of an unsaturated hydrocarbon selected from the group consisting of an olefinically unsaturated hydrocarbon and an acetylenically unsaturated hydrocarbon, (2) at least one kind of an organic compound of the metal selected from the group consisting of nickel, cobalt and iron, and (3) at least one kind of a metal compound reducing agent.

U.S. Pat. No. 3,766,300 (De La Mare, Oct. 16, 1973) discloses a process for the hydrogenation of copolymers prepared from conjugated dienes and certain copolymerizable polar monomers such as vinyl pyridines, acrylonitriles, and alpha-olefin oxides which comprises an initial step of forming a complex between at least one Lewis acid and the polar portions of the copolymer and thereafter subjecting the complex to hydrogenation. More particularly, this reference is especially concerned with a process for the hydrogenation of block copolymers derived from these monomers.

Japanese Patent 13,615 (Aug. 2, 1967; filed Feb. 15, 1963) relates to copolymers of butadiene and vinyl pyridine that were reduced to give waterproof, stable reduced copolymers. These products were useful for coating pills. The reduced copolymers were obtained by the catalytic hydrogenation in the presence of Raney nickel catalyst.

A paper titled "Oil-Resistant Rubbers from 2-Methyl Vinyl Pyridine," James E. Pritchard and Milton H. Opheim, *Industrial and Engineering Chemistry*, Volume 46, No. 10, pages 2242–2245, relates to quaternization of liquid polymers. Copolymers of butadiene and 2-methyl-5-vinyl pyridine (MVP) react with quaternizing agents to form polymeric salts of the type:

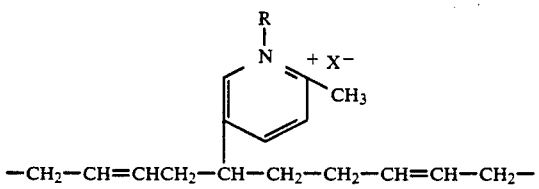

where R is an aliphatic or aromatic radical and X represents halide, alkyl sulfate, or aryl sulfonate groups.

In addition, commercially available fluoroelastomers are synthesized by the copolymerization of fluoro olefins, for example

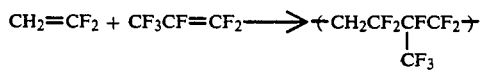

Due to the saturated backbone and presence of carbon fluorine bonds, the fluoro polymers have high thermooxidative stability when compared to their hydrocarbon counterparts. The major drawback of these fluoro elastomers is their poor low temperature properties which is reflected in relatively high glass transition temperatures (Tg). The Tg's of oil-resistant non-fluorinated elastomers are lower. Nitrile (i.e., butadiene/acrylonitrile copolymer with 40 weight percent acrylonitrile) and hydrogenated nitrile rubber exhibit Tg's of about minus 30° C. versus a Tg of minus 20° C. for the fluorinated copolymer described above.

Elastomers derived from the copolymerization of fluorinated olefins with hydrocarbon olefins are also heat resistant due to the saturated backbone in these polymers. However, the lower the fluorine content, the lower the heat and oil resistance. Also, the glass transition temperature of these elastomers is not significantly improved when compared with the corresponding highly fluorinated counterparts.

When a hydrocarbon diene such as 1,3-butadiene bears a fluorinated substituent such as 2-trifluoromethyl, elastomeric homopolymers are obtained. Free radical polymerization can occur in a 1,2; 3,4; or 1,4 manner. Polymerization in the latter mode would lead to backbone unsaturation in the polymer, which is detrimental to the thermooxidative stability of the polymer, more so than the pendant unsaturation generated by polymerization in a 1,2- or 1,4- manner. Elastomeric polymers are also obtained when the hydrogen atoms of 1,3-butadiene are substituted with fluorine atoms (e.g., polyfluoroprene). However, these polymers also suffer from poor thermooxidative instability due to the presence of backbone unsaturation. Thermooxidative stability is increased in polymers derived from highly fluorinated 1,3-dienes, but these materials tend to be plastics.

Highly fluorinated 1,3-dienes can be copolymerized in emulsion with 1,3-diene hydrocarbons. Relatively low Tg materials can thus be obtained. For example, a copolymer of 1,1,2-trifluorobutadiene with butadiene in a 1 to 1 mole ratio has a Tg of minus 48° C.

U.S. Pat. No. 3,308,175 (Barr, Mar. 7, 1967) relates to novel fluorine-substituted dienes, to a method for the preparation thereof, to certain novel intermediates and the preparation thereof, and to certain novel intermediates for the production of homologous fluorine-substituted dienes.

U.S. Pat. No. 3,379,773 (Barr, Apr. 23, 1968) relates to polymeric compositions and to processes for the preparation of those compositions. Copolymers of 1,1,2-trifluorobutadiene-1,3 and the method of preparing the same are described within this reference along with comonomers hexafluorobutadiene-1,3; 3,4-dichloro-3,4,4-trifluorobutene-1; 2,2,2-trifluoroethyl vinyl ether; vinyl chloride; styrene; 1,1,2-trifluorobutene-1; and 1,1,4,4-tetrafluorobutadiene-1,3.

U.S. Pat. No. 3,398,128 (Bolstad et al, Aug. 20, 1968) relates to halogen-containing copolymers of 1,1,2-trifluorobutadiene-1,3 and another fluorinated 1,3-diene having from 4 to 5 carbon atoms per molecule containing two fluorine atoms on a terminal carbon atom and at least one hydrogen atom and the process for copolymerization of those monomers to produce such copolymers.

U.S. Pat. No. 3,562,341 (Tarrant et al, Feb. 9, 1971) relates to incompletely polyfluorinated 1,3-dienes capable of forming crosslinked polymers and having fluorine substituents in at least the 1,1,2-position, and to synthesis for their preparation. More particularly, this reference relates to a synthesis for 1,1,2-trifluorobutadiene-1,3 and to the compounds 1,1,2,4,4-pentafluorobutadiene-1,3, and 1,1,2,4,4-pentafluoro-3-methylbutadiene-1,3.

U.S. Pat. No. 3,607,850 (Smith, Sep. 21, 1971) relates to a method of polymerizing conjugated fluorinated dienes which are rubber-like, flexible at low temperatures, and resistant to mineral oils and other chemicals. More particularly, the reference relates to use of rhodium salts or complexes as catalysts for the polymerization or copolymerization of conjugated fluorinated dienes to produce high molecular weight elastomers.

SUMMARY OF THE INVENTION

Random copolymer compositions which function as oil-resistant elastomers are prepared by the emulsion polymerization of two monomeric classes. The first monomeric class consists of a conjugated diene, or branched conjugated diene, or mixtures thereof, containing from 4 to 8 carbon atoms. The second monomeric class is characterized by general Formula I

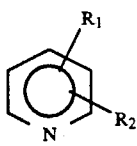

or by general Formula II:

$$CH_2=CR_8CX \quad (II)$$

With regard to Formula I, $R_1$ is an alkenyl group containing from about 2 to about 8 carbon atoms, and $R_2$ is hydrogen or an alkyl group containing from 1 to about 8 carbon atoms. The second monomeric class can be replaced with up to about 20 percent by weight of $CH_2=CR_3CX$ wherein $R_3$ is hydrogen or methyl and X is $-OOR_4$, $-ONR_5R_6$ or $OOR_7OR_4$ wherein $R_4$ is an alkyl group containing from 1 to about 4 carbon atoms, $-CH_2CF_3$ or $-CH_3CF_2CF_2H$, $R_5$ and $R_6$ are alkyl groups independently containing from 1 to about 4 carbon atoms and $R_7$ is an alkylene group containing from 1 to about 4 carbon atoms. The random copolymer so formed is then hydrogenated using a transition metal catalyst and at least one complexing agent.

With regard to Formula II, $R_8$ is hydrogen or an alkyl group containing from 1 to about 4 carbon atoms and X is $-OOR_9$, $-ONR_{10}R_{11}$ or $-OOR_{12}OR_9$ wherein $R_9$ is an alkyl group containing from 1 to 4 carbon atoms, $-CH_2CF_3$, or $-CH_2CF_2CF_2H$, $R_{10}$ and $R_{11}$ are alkyl groups independently containing from 1 to about 4 carbon atoms and $R_{12}$ is an alkylene group containing from 1 to about 4 carbon atoms. Mixtures of this second monomeric class may also be employed. The second monomeric class can be replaced with up to about 20 percent by weight of

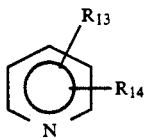

where $R_{13}$ is an alkenyl group containing from about 2 to about 8 carbon atoms and $R_{14}$ is hydrogen or an alkyl group containing from 1 to about 8 carbon atoms. The random copolymers so formed is then hydrogenated using a transition metal catalyst and at least one complexing agent.

In addition, fluorinated copolymers which function as oil resistant elastomers are prepared by emulsion copolymerization of two monomer classes. The first monomer comprises a fluorodiene of the structure

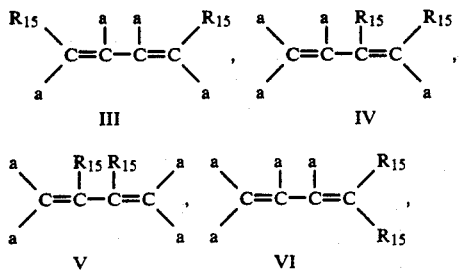

or $$\begin{array}{c} F \\ \diagdown \\ C=C-C=C \\ \diagup \\ F \end{array} \begin{array}{c} F \quad R_{16} \quad R_{17} \\ | \quad | \\ \diagdown \\ \diagup \\ H \end{array}$$

VII wherein substituent a is independently hydrogen or fluorine, $R_{15}$ is hydrogen or a fluoro alkyl group containing from 1 to about 4 carbon atoms and containing at least three fluoro atoms, with the proviso that both $R_{15}$ groups are not hydrogen, $R_{16}$ and $R_{17}$ are independently fluorine, hydrogen or a fluoro alkyl group containing from 1 to about 4 carbon atoms and containing at least three fluorine atoms.

The second monomer is (a) a hydrocarbon diene comprising a straight chain conjugated diene, a branched conjugated diene or mixtures thereof containing from 4 to about 8 carbon atoms, or a monomer(b), (b) being a monomer of the general formula $CH_2=CR_{18}X$ wherein $R_{18}$ is hydrogen or an alkyl group containing from 1 to about 4 carbon atoms, and X is 2-pyridyl, 4-pyridyl, $-COOR_{19}$, $-CONR_{20}R_{21}$ or $-COOR_{22}OR_{19}$ wherein $R_{19}$ is an alkyl group containing from 1 to about 4 carbon atoms, $-CH_2CF_3$ or $-CH_2CF_2CF_2H$, $R_{20}$ and $R_{21}$ are alkyl groups containing from 1 to about 4 carbon atoms, and $R_{22}$ is an alkylene group containing from 1 to about 4 carbon atoms. The second monomer may also comprise a mixture of monomers (a) and (b). The mole ratio of diene (a): $CH_2=CR_{18}X$ (b), when (b) is present, is from 1:7 to about 7:1 and wherein the mole ratio of first monomer:second monomer is from about 4:3 to about 2:3.

The copolymer so formed is then hydrogenated using a transitional metal catalyst and a complexing agent and the transitional metal catalyst is deactivated after hydrogenation by using a second complexing agent, in the absence of air.

DETAILED DESCRIPTION OF THE INVENTION

Figure 1:
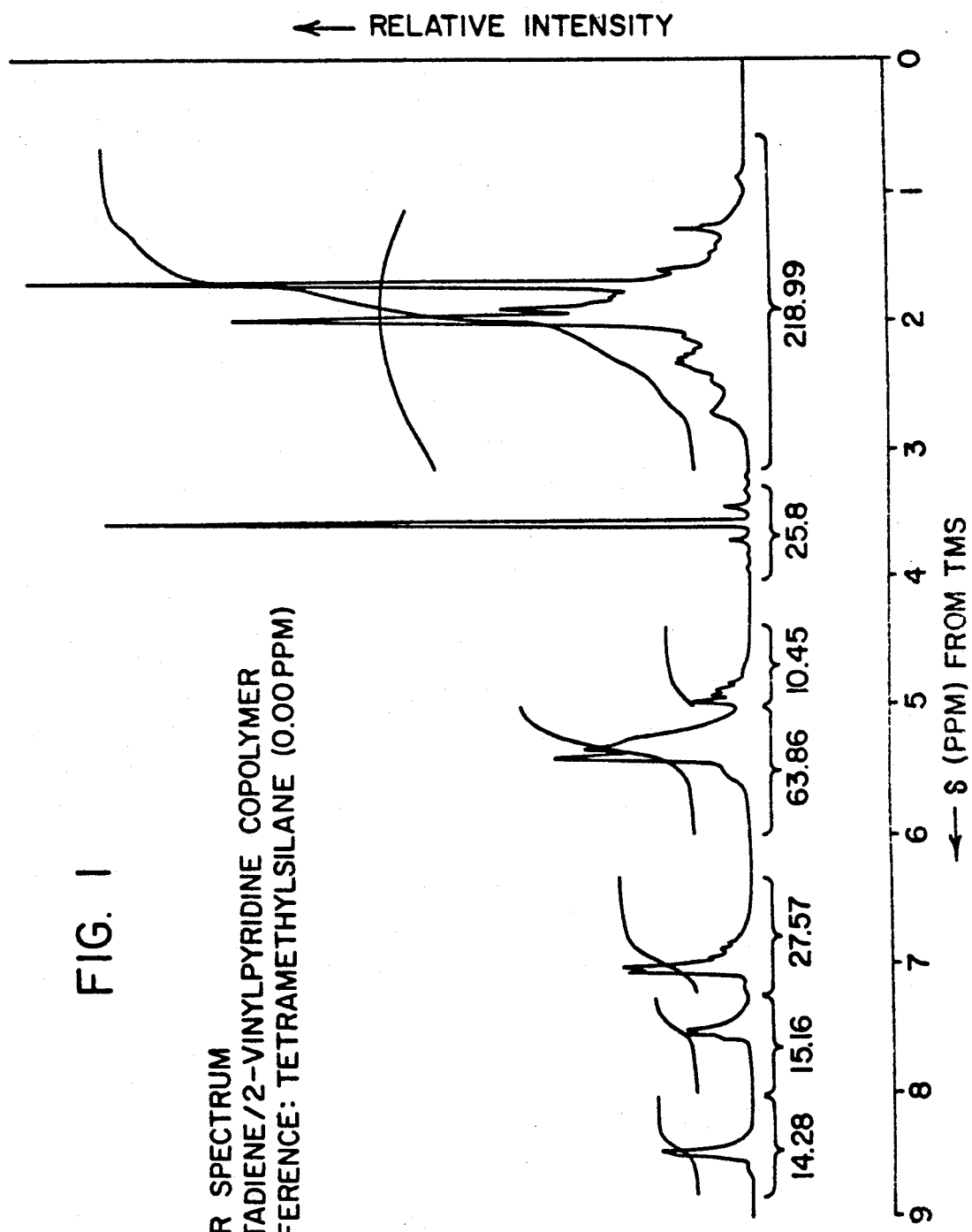
FIG. 1 is a graph of the proton magnetic resonance spectrum of the unhydrogenated butadiene/2-vinylpyridine copolymer.

This invention deals with compositions and a method for preparing high temperature, oil-resistant elastomers by the copolymerization of two monomeric classes followed by the hydrogenation of the copolymer. Direct polymerization of ethylene with acrylonitrile to give HNBR is not feasible due to the difference in reactivities of the monomers under the copolymerization conditions. This is generally true in the case of copolymerization of ethylene with any polar alpha, beta unsaturated monomer. Direct copolymerization of ethylene and polar alpha, beta unsaturated monomers (including acrylonitrile) using transition metal catalysts have been unsuccessful.

Free radical polymerization at very high pressures, ca 2000 atmospheres, results in comparable reactivity for ethylene and acrylonitrile, but the polymerization process is plagued with side reactions that preclude high molecular weight polymer formation. The polymer obtained thus is a poor candidate for crosslinking to an elastomer.

Free radical polymerization can be performed at lower pressure, ca 60 atmospheres, in a solvent using a Lewis acid as the complexing agent for the polar monomer, acrylonitrile. As an almost perfectly alternating copolymer is formed, the low temperature properties are poorer than the corresponding random copolymer. Also, tensile strength is reduced in the perfectly alternating copolymer, due to the lack of polyethylene segments which is responsible for the high strength of the random copolymer.

Conjugated dienes readily copolymerize with polar alpha, beta monomers in emulsion to give high molecular weight copolymers. Subsequent hydrogenation of the backbone unsaturation in these polymers is an alternate route to copolymers of ethylene with polar alpha, beta unsaturated monomers.

The first monomeric class is a straight chain conjugated diene, a branched chain conjugated diene, or mixtures thereof. This diene contains from 4 to 8 carbon atoms. Examples of straight chain dienes are 1,3-butadiene, 1,3-pentadiene, 1,3-hexadiene, 1,4-hexadiene, 1,3-heptadiene, 2,4-heptadiene, 1,3-octadiene, 2,4-octadiene, and 3,5-octadiene. Some representative examples of branched chain dienes are isoprene, 2,3-dimethyl-1,3-butadiene, 2-methyl-1,3-hexadiene, 3-methyl-1,3-hexadiene, 2-methyl-2,4-hexadiene, 3-methyl-2,4-hexadiene, 2,3-dimethyl-1,3-pentadiene, 2,4-dimethyl-1,3-pentadiene, 2-ethyl-1,3-pentadiene, and 3-ethyl-1,3-pentadiene. The preferred dienes for the practice of this invention are butadiene and isoprene.

In a first embodiment of the present invention, the second monomeric class is of the general formula:

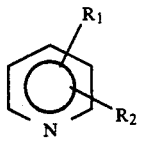
(I)

and in a second embodiment, the second monomeric class is of the general formula:

$$CH_2=CR_8CX \qquad (II)$$

With regard to Formula I of the first embodiment, $R_1$ is an alkenyl group containing from about 2 to about 8 carbon atoms, preferably from about 2 to 6, and most preferably from 2 to about 4 carbon atoms. Particularly, $R_1$ is vinyl. $R_2$ is hydrogen or an alkyl group containing from 1 to about 8 carbon atoms. When $R_2$ is an alkyl group, it preferably contains from 1 to about 6 carbon atoms and most preferably from 1 to about 4 carbon atoms. When $R_2$ is alkyl, a particular group is methyl.

The general formula (I) of the second monomeric class can be replaced with up to about 20 percent by weight of general formula IA $$CH_2=CR_3CX \qquad (IA)$$

$R_3$ is hydrogen or methyl and X is $-OOR_4$, $-ONR_5R_6$ or $-OOR_7OR_4$ wherein $R_4$ is an alkyl group containing from 1 to about 4 carbon atoms, $-CH_2CF_3$ or $-CH_2CF_2CF_2H$, $R_5$ and $R_6$ are alkyl groups independently containing from 1 to about 4 carbon atoms and $-OOR_7OR_4$ is an alkylene group containing from 1 to about 4 carbon atoms. When $R_3$ is hydrogen or methyl and X is $-OOR_4$, some examples of general formula IA are acrylates, methacrylates, fluorinated acrylates or fluorinated methacrylates. When $R_3$ is hydrogen or methyl and X is $-ONR_5R_6$, general formula IA may be tertiary acrylamides or tertiary methacrylamides. When X is $-OOR_7OR_4$, preferably $R_7$ is an alkylene group containing from 1 to about 2 carbon atoms and $R_4$ is an alkyl group containing from 1 to about 2 carbon atoms. Preferably at least 3 percent of general formula (IA) is present in the second monomeric class and most preferably at least 7 percent of general formula (IA) is present in the second monomeric class.

In the second embodiment, the second monomeric class is of the general formula:

$$CH_2=CR_8CX \qquad (II)$$

wherein $R_8$ is hydrogen or an alkyl group containing from 1 to about 4 carbon atoms and X is $-OOR_9$, $-ONR_{10}R_{11}$ or $-OOR_{12}OR_9$ wherein $R_9$ is an alkyl group containing from 1 to about 4 carbon atoms, $-CH_2CF_3$, or $-CH_2CF_2CF_2H$, $R_{10}$ and $R_{11}$ are alkyl groups independently containing from 1 to about 4 carbon atoms and $R_{12}$ is an alkylene group containing from 1 to about 4 carbon atoms. Preferably $R_8$ is hydrogen or an alkyl group containing from 1 to 2 carbon atoms and most preferably $R_8$ is hydrogen or methyl. When X is $-OOR_9$, $R_9$ preferably is an alkyl group containing from 1 to 2 carbon atoms, most preferably $R_9$ is methyl. When X is $-ONR_{10}R_{11}$, preferably $R_{10}$ and $R_{11}$ are alkyl groups independently containing from 1 to 2 carbon atoms and most preferably $R_{10}$ and $R_{11}$ are methyl. When X is $-OOR_{12}OR_9$ preferably $R_{12}$ is an alkylene group containing from 1 to about 2 carbon atoms and $R_9$ is an alkyl group containing from 1 to about 2 carbon atoms.

When $R_8$ is hydrogen or methyl and X is —$OOR_9$, some examples of general Formula II are acrylates, methacrylates, fluorinated acrylates, or fluorinated methacrylates. When $R_8$ is hydrogen or methyl and X is —$ONR_{10}R_{11}$, general Formula II may be tertiary acrylamides or tertiary methacrylamides. When $R_8$ is hydrogen or methyl and X is —$OOR_{12}OR_9$ general formula I may be alkoxyalkyl acrylates or methacrylates.

The general Formula II of the second monomeric class can be replaced with up to about 20 percent by weight of general Formula IIA

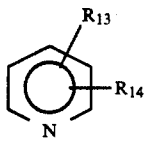
(IIA)

In general formula IIA, $R_{13}$ is an alkenyl group containing from about 2 to about 8 carbon atoms and $R_{14}$ is hydrogen or an alkyl group containing from about 1 to about 8 carbon atoms. Preferably $R_{13}$ is an alkenyl group containing from about 2 to about 6 carbon atoms, and most preferably from 2 to about 4 carbon atoms. Particularly, $R_{13}$ is vinyl. When $R_{14}$ is an alkyl group, it preferably contains from 1 to about 6 carbon atoms and most preferably from 1 to about 4 carbon atoms. When $R_{14}$ is alkyl, a particular group is methyl. Preferably at least 3 percent of general Formula IIA is present in the second monomeric class and most preferably at least 7 percent of general Formula IIA is present in the second monomeric class.

The hydrogenated random copolymers of the first two embodiments of this invention have utility as high temperature oil-resistant elastomers. The hydrogenated random copolymers of these embodiments may be solids or liquids, depending on molecular weight. These hydrogenated random copolymers serve as thermooxidatively stable oil resistant elastomers or as impact modifiers for plastics. Products made from these elastomers find use for seals, gaskets, and hoses. The liquid polymers can be used as processing aids and/or modifiers in rubber and plastic compounding.

Conjugated 1,3-dienes copolymerize readily with alpha,beta unsaturated monomers other than acrylonitrile. Examples of two such monomer classes are vinyl pyridine or acrylates. These copolymers, like NBR, are also oil resistant. In addition, hydrogenation of the polymer backbone together with the pendant unsaturation derived from the hydrocarbon diene of the conjugated diene/vinyl pyridine and conjugated diene/acrylate copolymers is possible with inexpensive homogeneous catalysts based on iron, cobalt or nickel by the process of the present invention. Hence, high temperature oil resistant elastomer compositions of the present invention can be obtained at a cost lower than that of HNBR.

The first step in the preparation of an oil-resistant elastomer is in forming a random copolymer of the two monomeric classes. The random copolymer is formed by emulsion polymerization. The weight ratio of the first monomeric class:the second monomeric class is from about 25-85:75-15, preferably 40-60:60-40, and most preferably 55-60:45-40.

The random copolymer is made in a conventional manner. That is, the above-noted monomers are added to suitable amounts of water in a polymerization vessel along with one or more conventional ingredients and polymerized. The amount of polymerized solids or particles is generally from about 15 percent to about 50 percent with from about 25 to about 35 percent by weight being desired. The temperature of polymerization is generally from about 5° C. to about 80° C. with from about 5° C. to about 20° C. being preferred. Typically in excess of 60 percent and usually from about 70 percent to about 95 percent conversion is obtained with from about 80 percent to about 85 percent conversion being preferred. The polymerization is generally initiated by free radical catalysts which are utilized in conventional amounts. Examples of such catalysts include organic peroxides and hydroperoxides such as benzoyl peroxide, dicumyl peroxide, cumene hydroperoxide, paramenthane hydroperoxide, and the like, used alone or with redox systems; diazo compounds such as dimethyl 2,2'-azobisisobutyrate, and the like; persulfate salts such as sodium, potassium, and ammonium persulfate, used alone or with redox systems; and the use of ultraviolet light with photo-sensitive agents such as benzophenone, triphenylphosphine, organic diazos, and the like.

Inasmuch as the random copolymers are prepared via an emulsion latex polymerization route, anionic emulsifying aids are utilized. Thus, various conventional anionic surfactants known to the art as well as to the literature are utilized. Generally, any suitable anionic surfactant can be utilized such as those set forth in McCutcheons, "Detergents and Emulsifiers," 1978, North American Edition, Published by McCutcheon's Division, MC Publishing Corp., Glen Rock, N.J., U.S.A., as well as the various subsequent editions thereof, all of which are hereby fully incorporated by reference. Desirably, various conventional soaps or detergents are utilized such as a sodium alkyl sulfate, wherein the alkyl group has from 8 to 22 carbon atoms such as sodium lauryl sulfate, sodium stearyl sulfate, and the like, as well as various sodium alkyl benzene sulfonates, wherein the alkyl group has from 8 to 22 carbon atoms such as sodium dodecyl benzene sulfonate, and the like. Other anionic surfactants include sulfosuccinates and disulfonated alkyl benzene derivatives having a total of from 8 to 22 carbon atoms. Various phenyl type phosphates can also be utilized. Yet other anionic surfactants include various fatty acid salts having from 12 to 22 carbon atoms as well as various rosin acid salts wherein the salt portion is generally lithium, sodium, potassium, ammonium, magnesium, and the like. The selection of the anionic surfactant generally depends on the pH of the polymerization reaction. Hence, fatty acid salts and rosin acid salts are not utilized at low pH values.

The amount of the surfactant can vary depending upon the size of random copolymer particles desired, but typically is from about 1 percent to about 6 percent and desirably from about 2 percent to about 3 percent by weight for every 100 parts by weight of the random copolymer forming monomers.

Other anionic emulsifying aids are various anionic electrolytes which control particle size by controlling the solubility of the soap. Examples of various conventional electrolytes generally include sodium, potassium, or ammonium naphthalene sulfonates. Other suitable electrolytes include sodium sulfate, sodium carbonate, sodium chloride, potassium carbonate, sodium phosphate, and the like. The amount of electrolyte is generally from about 0.1 to about 1.0 parts by weight and preferably from about 0.2 to about 0.5 parts by weight for every 100 parts by weight of the random copolymer forming monomers.

Molecular weight modifiers are also utilized to maintain the molecular weight within desirable limits as otherwise the viscosity of the polymer would be exceedingly high for subsequent handling, processing, and the like. Generally, known conventional molecular weight modifiers can be utilized such as various mercaptans which have from about 8 to about 22 carbon atoms, generally in the form of an alkyl group. Various sulfide compounds can also be utilized such as diisopropylxanthogendisulfide and di-sec-butylxanthogendisulfide. The amount of the molecular modifiers is generally an effective amount such that the Mooney viscosity, that is $ML_4$ @100° C. is from about 10 to about 120 and desirably from about 20 to about 80.

Yet another conventional emulsion latex additive is various short stop agents which are added generally to stop the polymerization and to tie up and react with residual catalysts. The amount of the short stop agents is from about 0.05 to about 1.0 parts by weight per 100 parts by weight of said random copolymer forming monomers. Examples of specific short stop agents include hydroxyl ammonium sulfate, hydroquinone and derivatives thereof, e.g., ditertiaryamylhydroquinone, various carbamate salts such as sodium diethyldithiocarbamate, various hydroxyl amine salts, and the like. Various antioxidants can be added and such are known to the art as well as to the literature including various phenolic type antioxidants such as di-tert-butyl-paracresol, various diphenylamine antioxidants such as octylated diphenylamine, various phosphite antioxidants such as trisnonyl phenyl phosphite, and the like. Once the short stop has been added to the latex solution, excess monomer is stripped from the resultant latex, as for example by steam.

A cationic coagulant polymer is utilized to coagulate the anionic emulsifying aids such as the various anionic surfactants and the various anionic electrolytes utilized. Polymeric cationic type coagulants are utilized according to the present invention inasmuch as they have a positive site which generally reacts with the negative or anionic site of the surfactant, electrolyte, etc., and thereby neutralize the same and render it innocuous. That is, according to the concepts of the present invention, the anionic emulsifying aids are not physically removed but rather are chemically reacted with a cationic polymeric coagulant to form an adduct which is generally dispersed throughout the random copolymer particle.

Large stoichiometrically equivalent amounts of cationic polymeric coagulants are utilized. That is, large weight equivalents are required in order to yield a random copolymer having improved properties. Generally, from about 0.75 to about 1.5 weight equivalents, desirably from about 0.85 to about 1.25, and preferably from about 0.95 to about 1.05 weight equivalents of the cationic polymeric coagulant is utilized for every weight equivalent of said anionic emulsifying aids. Equivalent weight amounts less than those set forth herein do not result in effective neutralization, tying up, or negate the effect which the various anionic emulsifying aids have upon the properties of the dried rubber particles.

The cationic polymeric coagulants utilized in the present invention generally contain a tetravalent nitrogen and are sometimes referred to as polyquats. This invention Cationicity of the quaternary nitrogen is generally independent of pH, although other parts of the polymer molecule may exhibit sensitivity to pH such as hydrolysis of ester linkages. Typically, cationic polymers are prepared either by quaternization of poly(alkylene polyamines), poly(hydroxyalkylene polyamines), or poly(carbonylalkylene polyamine) with alkyl halides or sulfates, or by step-growth polymerization from dialkylamines, tetraalkyl amines, or derivatives thereof, with suitable bifunctional alkylating agents, and with or without small amounts of polyfunctional primary amines (such as ammonia, ethylene diamines, and others) for molecular weight enhancement. Polyamines produced from ammonia and ethylene dichloride, quaternized with methyl chloride, and polyquaternaries produced directly from dimethylamine and 1-chloro-2,3-epoxypropane are generally of commercial significance. Epichlorohydrin reacts with ammonia and primary, secondary, or polyfunctional amines to form polyamines or polyquats. The polyamines can be subsequently quaternized to yield a cationic polymeric coagulant of the present invention. As known to those skilled in the art and to the literature, literally hundreds of cationic polymeric coagulants exist and generally the same can be utilized in the present invention. Examples of specific polymeric cationic coagulants include poly(2-hydroxypropyl-1-N-methylammonium chloride), poly(2-hydroxypropyl-1,N,N-dimethylammonium-chloride),poly(diallyldimethylammonium chloride), poly(N,N-dimethylaminoethyl methacrylate) quaternized, and a quaternized polymer of epichlorohydrin and a dialkylamine wherein the alkyl group has from 1 to 5 carbon atoms with methyl being preferred. The method of preparing cationic polymeric coagulants, general types of such compounds as well as specific individual compounds are set forth in the following documents which are hereby fully incorporated by reference with regard to all aspects thereof:

*Encyclopedia of Polymer Science and Technology*, John Wiley & Sons, New York, 1987, Volume 11, 2nd Edition, pages 489–503.

*Encyclopedia of Polymer Science and Technology*, John Wiley & Sons, New York, 1987, Volume 7, 2nd Edition, pages 211–229.

*Kirk Othermer's Encyclopedia of Chemical Technology*, 3rd Edition, Volume 10, John Wiley & Sons, New York, 1980, pages 489–523.

A text entitled *Commercial Organic Flocculants*, Josef Vostrcil and Frantisek Juracka, Noyes Data Corporation, Park Ridge, N.J., 1976, in its entirety.

The cationic polymeric coagulants utilized in the first two embodiments of the present invention generally have a molecular weight of from about 1,000 to about 10,000,000.

According to the first two embodiments of the present invention, the cationic polymeric coagulant treated random copolymer latex generally results in a slurry of rubber crumbs in a clear aqueous liquid. The crumbs contain the various anionic emulsifying aids physically incorporated therein. Such crumbs can be separated in any conventional manner as by filtering. Inasmuch as the anionic emulsifying aids have been rendered innocuous, multiple washing steps or other expensive, tedious process steps such as solvent extraction are not utilized.

The random copolymers of the first two embodiments of the present invention once dried as by conventional means, have improved properties such as good water resistance, good adhesion properties, non-interference with cure systems when cured, reduce fouling of molds during the manufacture of parts, improved electrical insulating properties, and the like. Such polymers can accordingly be utilized as adhesives, that is polymeric adhesives, binders, films, e.g., electrical insulating films, coatings such as for electrical circuit boards along with other conventional coating additives and fillers known to the art and to the literature, and the like. Suitable adhesive uses include metal-to-metal adhesion, metal-to-fabric adhesion, metal-to-plastic adhesion, and the like. Additionally, the polymers of the first two embodiments of this invention have utility in the automotive area such as in hoses, gaskets, seals, and timing belts.

The random copolymers can be prepared with a mercaptan chain transfer agent composition comprising (a) at least one mercaptan chain transfer agent and (b) at least one non-polymerizable material which is miscible with the mercaptan chain transfer agent. Suitable mercaptans include water soluble mercaptans such as 2-mercaptoethanol, 3-mercaptopropanol, thiopropyleneglycol, thioglycerine, thioglycolic acid, thiohydracrylic acid, thiolactic acid, and thiomalic acid, and the like. Suitable non-water soluble mercaptans include isooctyl thioglycolate, n-butyl 3-mercaptopropionate, n-butyl thioglycolate, glycol dimercaptoacetate, trimethylolpropane trithioglycolate, alkyl mercaptans, and the like. The preferred mercaptans are 2-mercaptoethanol and t-dodecylmercaptan, however, any chain transfer agent having a mercapto (—SH) group would be acceptable.

The chain transfer composition, in addition to the mercaptan, may contain at least one non-polymerizable material which is miscible with the mercaptan and is substantially insoluble in water. The term nonpolymerizable as used herein means that the material does not form a part of the random copolymer chain in the sense that a traditional comonomer would form. The non-polymerizable material may, in some cases, graft polymerize onto the random copolymer chain but this is not normally considered a copolymer. The term substantially insoluble in water as used in this specification means that the material has less than 5 percent solubility in water. The non-polymerizable material may be a monomer, oligomer or a polymer. Suitable nonpolymerizable materials include dioctyl phthalate, low molecular weight poly(caprolactone), polysilicones, esters of glycerols, polyesters, water insoluble esters of fatty acids with —OH terminated polyoxyethylene and polyoxypropylene, esters of polyols, esters of monoacids and polyacids, esters of organic polyphosphates, phenyl ethers, ethoxylated alkylphenols, sorbitan monostearate and sorbitan monooleate and other sorbitol esters of fatty acids. The choice of material is not critical as long as the material is non-polymerizable with the monomers and is substantially insoluble in water.

The chain transfer composition must contain at least enough non-polymerizable material to encapsulate the mercaptan chain transfer agent. This amount varies according to the type and amount of chain transfer agent used. Usually, the chain transfer composition must contain at least an equal amount in weight of non-polymerizable material as chain transfer agent in order to encapsulate or host the chain transfer agent. Preferably, the composition contains at least twice as much weight of non-polymerizable material as chain transfer agent. Other non-essential ingredients may be used in the chain transfer compositions of this invention but are not preferred.

The chain transfer compositions are formed by mixing the two essential ingredients together. The method used to mix the ingredients is not critical and may be any of the known methods used by those skilled in the art. The ingredients may even be charged to the polymerization reactor and mixed before adding the other polymerization ingredients but is preferably mixed outside the reactor.

Because of the detrimental effects that mercaptans, such as 2-mercaptoethanol have on colloidal stability, it is necessary to mix the 2-mercaptoethanol with the non-polymerizable material before adding it to the reaction medium. The non-polymerizable material serves as a host material for the chain transfer agent. This procedure surprisingly eliminates the adverse effects of 2-mercaptoethanol on colloidal stability. It is believed that the non-polymerizable material averts the adverse effect of 2-mercaptoethanol on colloidal stability via encapsulation, complexation or interaction and, thus, allows relatively high levels of 2-mercaptoethanol to be introduced to the reaction medium prior to the start of polymerization. The term "encapsulation" as used herein is not intended as the traditional meaning of encapsulation which is to coat or contain and the result is a heterogeneous system. The chain transfer composition of this invention is homogeneous.

The level of chain transfer composition used to make the random copolymer will be described in terms of the level of mercaptan in the composition. The level of mercaptan used is greater than 0.03 part by weight per 100 parts by weight of diene monomer. The preferred levels of mercaptan range from about 0.03 to about 5.00 parts by weight per 100 parts of monomer, and, preferably, from 0.10 to 1.50 parts.

When high amounts of mercaptan, such as 2-mercaptoethanol, are used, it is desirable to not charge the entire amount of chain transfer agent at the beginning of polymerization since 2-mercaptoethanol has a diminishing effect on molecular weight above about the 1.5 parts level. Therefore, if, for example, 3.0 parts were used, it would be advisable to add only up to 1.5 parts at the beginning of polymerization and to gradually add the remainder during polymerization. Amounts added at the beginning which are greater than 1.5 parts do not result in colloidal instability. However, for the most efficient use of chain transfer agent, it is preferred to not add more than 1.5 parts before the beginning of polymerization. This preferred initial level could, of course, be different for different mercaptans. The above described preferred procedure is for 2-mercaptoethanol.

If less than 0.25 part by weight of chain transfer agent is used, then all of the chain transfer agent will be added in the form of the chain transfer composition before the beginning of polymerization. If more than 0.25 part is used, then at least 0.25 part will be added in the form of the chain transfer composition before the beginning of polymerization and the remainder may be added later. To gain the most efficiency of the chain transfer agent, no more than 1.5 parts by weight should be added before the start of polymerization. For best results, at least 50 percent of the chain transfer agent, preferably 100 percent, is added to the polymerization medium prior to the start of polymerization. Any amount not added at the start and not encapsulated should be added after the polymerization has reached about 10 percent conversion to maintain colloidal stability. Except for the use of the chain transfer composition, the polymerization is much the same as in any conventional polymerization of a diene monomer in an aqueous medium.

Another class of chain-transfer agents that are used in the process of the first two embodiments of this invention are mercapto organic compounds having at least one ether linkage that have the structural formula

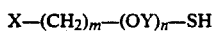

X—(CH$_2$)$_m$—(OY)$_n$—SH wherein X represents hydrogen or —SH, Y represents an alkylene group having 1 to 6 carbon atoms, and m and n each represents a number in the range of 1 to 10.

A preferred group of ether linkage chain-transfer agents includes mercapto organic compounds that have the structural formula

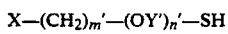

X—(CH$_2$)$_{m'}$—(OY')$_{n'}$—SH wherein X represents hydrogen or —SH, Y' represents an alkylene group having 2 to 4 carbon atoms, and m' and n' each represents a number in the range of 2 to 4.

Illustrative of the ether linkage chain-transfer agents that can be used in the practice of this invention are the following compounds:
mercaptomethyl ethyl ether,
2-mercaptoethyl ethyl ether,
2-mercaptoethyl propyl ether,
2-mercaptoethyl butyl ether,
3-mercaptopropyl methyl ether,
3-mercaptopropyl ethyl ether,
3-mercaptopropyl butyl ether,
2-mercaptopropyl isopropyl ether,
4-mercaptobutyl ethyl ether,
bis-(2-mercaptoethyl) ether,
bis-(3-mercaptopropyl) ether,
bis-(4-mercaptobutyl) ether,
(2-mercaptoethyl) (3-mercaptopropyl) ether,
(2-mercaptoethyl)(4-mercaptobutyl) ether,
ethoxypolypropylene glycol mercaptan,
methoxypolyethylene glycol mercaptan,
and the like and mixtures thereof.

Among the preferred ether linkage chain-transfer agents are 2-mercaptoethyl ethyl ether and bis-(2-mercaptoethyl) ether.

The amount of the ether linkage chain-transfer agent that is used in the polymerization reaction is that which will provide a polymer having the desired molecular weight or degree of polymerization. In most cases from 0.01 percent to 2 percent by weight, based on the weight of the monomer component, is used. When a low molecular weight product that has a relative viscosity in the range of 1.20 to 1.60 is desired, the amount of chain transfer agent used is preferably in the range of 0.25 percent to 1.75 percent by weight, based on the weight of the monomer. Amounts in the range of 0.05 percent to 0.15 by weight, based on the weight of the monomer, are preferably used to produce polymers having high molecular weights.

The random copolymers obtained in the first two embodiments of the present invention generally have a weight average molecular weight of from about 20,000 to about 1,000,000; desirably from about 200,000 to about 750,000; and preferably from about 400,000 to about 500,000.

The first two embodiments of the present invention will be better understood by reference to the following examples.

EXAMPLE 1

First Embodiment

The below Table I shows the preparation of a random copolymer of butadiene and 2-vinylpyridine. Items 1 through 9 are initially charged into a 15 gallon reactor under nitrogen and cooled to 5° C. Polymerization is initiated by adding items 10 through 12. These three items promote peroxide breakdown thereby generating initiator radicals. The conversion is monitored by measuring total solids content every hour. At 35 percent conversion, the additional items 1 through 5 are added. After 20 hours, at 5° C., 80 percent conversion is obtained and the reaction is terminated by adding item 13. After removal of volatiles, the latex is coagulated in hot water (70° C.) containing 1.5 weight percent of aluminum sulfate to form a crumb. The crumb is filtered, washed with water and dried in air at 100° C. for 4 hours.

TABLE I

| Item | Material | Purity % | Added Initially | Added at 35% Conv. | Total |
|---|---|---|---|---|---|
| 1 | Soft Water | 100 | 186.48 | 12.83 | 199.31 |
| 2 | Sipex SB emulsifier | 30 | 2.0 | 1.0 | 3.0 |
| 3 | Sodium Naphthalene Sulfonate Secondary Emulsifier | 100 | .67 | .33 | 1.0 |
| 4 | Sodium Carbonate Electrolyte | 100 | .16 | .08 | .24 |
| 5 | Sulfole 120 Chain Transfer Agent | 100 | .18 | .12 | .30 |
| 6 | Cumene Hydroperoxide Initiator | 82.5 | .115 | — | .115 |
| 7 | Sodium Hydrosulfite Oxygen Scavenger | 100 | .007 | — | .007 |
| 8 | Butadiene Monomer | 100 | 45 | — | 45 |
| 9 | 2-Vinylpyridine Monomer | 100 | 45 | — | 45 |
| 10 | Trisodium Ethylenediamine Tetraacetate Trihydrate Complexing Agent for iron salts | 100 | .01 | — | .01 |
| 11 | Sodium Ferric Ethylene Diamine Tetraacetate | 100 | .015 | — | .015 |
| 12 | Sodium Formaldehyde | 100 | .105 | — | .105 |

TABLE I-continued

| | | | Parts by Weight | | |
|---|---|---|---|---|---|
| Item | Material | Purity % | Added Initially | Added at 35% Conv. | Total |
| 13 | Sulfoxylate Reducing Agent for Ferric Salts Hydroxyl Ammonium Sulfate Short Stop | 100 | — | — | .3 |

EXAMPLES 2-5

First Embodiment

Examples 2 through 5 essentially follow the procedure of Example 1 except for the monomers and level of monomers employed. Table II outlines Examples 2 through 5.

TABLE II

| Example No. | First Monomer | Second Monomer | Ratio of First & Second Monomer |
|---|---|---|---|
| 2 | Butadiene | 2-vinylpyridine | 40:60 |
| 3 | Isoprene | 2-vinylpyridine | 50:50 |
| 4 | Isoprene | 4-vinylpyridine | 55:45 |
| 5 | 2,3-dimethyl 1,3-butadiene | 2-methyl-5-vinyl-pyridine + 3% methyl-methacrylate | 50:50 |

The random copolymer obtained has a high cis-trans-1,4 microstructure rather than 1,2 and/or 3,4 microstructure (depending upon the diene). The combined mole percent of cis-trans 1,4-microstructure to vinyl microstructure has been determined to be 3.7:1 by proton magnetic resonance when the copolymers have a weight ratio of 60 percent butadiene to 40 percent 2-vinylpyridine by weight. The cis and trans microstructure get hydrogenated to linear polyethylene segments which are responsible for the improved mechanical properties of the elastomer due to stretch crystallinity (A. H. Weinstein, *Rubber Chemical Technology* 57, 203 (1984)).

EXAMPLE 6

Second Embodiment

The below Table III shows the preparation of a random copolymer of butadiene and methyl acrylate. Items 1 through 9 are initially charged into a 15 gallon reactor under nitrogen and cooled to 5° C. Polymerization is initiated by adding items 10 through 12. These three items promote peroxide breakdown thereby generating initiator radicals. The conversion is monitored by measuring total solids content every hour. At 35 percent conversion, the additional items 1 through 5 are added. After 20 hours, at 5° C., 80 percent conversion is obtained and the reaction is terminated by adding item 13. After removal of volatiles, the latex is coagulated in hot water (70° C.) containing 1.5 weight percent of aluminum sulfate to form a crumb. The crumb is filtered, washed with water and dried in air at 100° C. for 4 hours.

TABLE III

| | | | Parts by Weight | | |
|---|---|---|---|---|---|
| Item | Material | Purity % | Added Initially | Added at 35% Conv. | Total |
| 1 | Soft Water | 100 | 186.48 | 12.83 | 199.31 |
| 2 | Sipex SB emulsifier | 30 | 2.0 | 1.0 | 3.0 |
| 3 | Sodium Naphthalene Sulfonate Secondary Emulsifier | 100 | .67 | .33 | 1.0 |
| 4 | Sodium Carbonate Electrolyte | 100 | .16 | .08 | .24 |
| 5 | Sulfole 120 Chain Transfer Agent | 100 | .18 | .12 | .30 |
| 6 | Cumene Hydroperoxide Initiator | 82.5 | .115 | — | .115 |
| 7 | Sodium Hydrosulfite Oxygen Scavenger | 100 | .007 | — | .007 |
| 8 | Butadiene Monomer | 100 | 50 | — | 50 |
| 9 | Methyl Acrylate Monomer | 100 | 50 | — | 50 |
| 10 | Trisodium Ethylenediamine Tetraacetate Trihydrate complexing agent for iron salts | 100 | .01 | — | .01 |
| 11 | Sodium Ferric Ethylene Diamine Tetraacetate | 100 | .015 | — | .015 |
| 12 | Sodium Formaldehyde Sulfoxylate Reducing Agent for Ferric Salts | 100 | .105 | — | .105 |
| 13 | Hydroxyl Ammonium Sulfate Short Stop | 100 | — | — | .3 |

EXAMPLES 7-10

Examples 7 through 10 essentially follow the procedure of Example 6 except for the monomers and level of monomers employed. Table IV outlines Examples 7 through 10.

TABLE IV

| Example No. | First Monomer | Second Monomer | Ratio of First & Second Monomer |
|---|---|---|---|
| 7 | Butadiene | ethyl acrylate | 40:60 |
| 8 | Isoprene | methyl methacrylate | 50:50 |
| 9 | Isoprene | methyl acrylate + 3% 2-methyl-5-vinyl-pyridine | 55:45 |
| 10 | 2,3-dimethyl 1-3-butadiene | N,N-dimethyl methacryl-amide + 3% 4-vinylpyridine | 50:50 |

The random copolymer obtained has a high cistrans 1,4 microstructure rather than 1,2 and/or 3,4 microstructure (depending upon the diene). The combined mole percent of cis-trans 1,4-microstructure to vinyl microstructure has been determined to be 3.7:1 by proton magnetic resonance when the copolymers have a weight ratio of 50 percent butadiene to 50 percent methyl acrylate. The cis and trans microstructure get hydrogenated to linear polyethylene segments which are responsible for the improved mechanical properties of the elastomer due to stretch crystallinity (A. H. Weinstein, *Rubber Chemical Technology* 57, 203 (1984).

The random copolymer once obtained in either of the first two embodiments of the invention described above is then subjected to hydrogenation in the presence of a transition metal catalyst and trialkylaluminum catalyst in the presence of at least one complexing agent and further in the absence of $BF_3$ or $BF_3$ etherate.

Either a homogeneous or a heterogeneous catalyst may be used for the hydrogenation although a homogeneous catalyst is preferred. Since a homogeneous catalyst dissolves in solution, good contact is obtained with the random copolymer. The homogeneous catalysts are transition metal catalysts of either iron, cobalt, or nickel. These metals are present as halides, acetates, or acetylacetonates. Most suitable are transition metal salts that are soluble in the organic solvents used to dissolve the polymeric substrates. These salts then yield a homogeneous zero or low valent metallic species, which can be transformed efficiently under hydrogen into a metal hydride species that is the active hydrogenation catalyst. In general, the reduction of insoluble transition metal salts cause the reduced metallic species to encapsulate the metal salt substrate, thus preventing complete reduction. Transformation of this heterogeneous reaction product to the active metal hydride is also then inefficient. Thus, soluble transition metal salts are preferred such as the octoates, neodecanoates, or stearates of cobalt or nickel. The least hygroscopic of the above-mentioned salts, namely the neodecanoates (due to the bulky hydrophobic groups surrounding the metal ion), are most preferred as water is detrimental to the formation of an active hydrogenation catalyst. Other homogeneous catalysts that can be employed are palladium, platinum or rhodium present as tetrakistriphenylphosphine palladium (0), tetrakistriphenylphosphine platinum (0) or tristriphenylphosphinerhodium chloride.

Conventional homogeneous catalysts based on, for example, reduced cobalt salts are inexpensive compared to rhodium or palladium, but are only suitable for the hydrogenation of hydrocarbon polymers, e.g., a nickel catalyst is commercially used in the hydrogenation of Krayton, a triblock butadiene-styrene-butadiene copolymer. Hydrogenation of the polymer backbone of NBR is not possible using these catalysts, as the nitrile group in NBR acts as a catalyst poison, and, in some cases is itself reduced.

HNBR is commercially synthesized by the hydrogenation of NBR in solution. The relatively high cost of HNBR compared to NBR is partly due to the solution hydrogenation process, the major contribution to cost being the catalyst (rhodium or palladium).

The transition metal catalyst is employed with trialkylaluminum compounds, wherein the alkyl group contains from 1 to about 4 carbon atoms, which functions as a reducing agent. Other reducing agents that can be employed are dialkyl aluminum hydride, the dialkyl aluminum alkoxides of 1 to 4 carbon atoms, sodium borohydride, and lithium aluminum hydride. Additionally, other reductants are alkyl lithium, dialkyl magnesium, and alkyl magnesium halide wherein the alkyl groups are from 1 to 4 carbon atoms, and the halide is chloride or bromide.

The mole ratio of transition metal catalyst: reducing agent is usually from 1:10, preferably 1:6, and most preferably from 1:4.

In accordance with one of the main features of the present invention, the transition metal catalyst complexes with at least one complexing agent. Without the complexing agent, addition of the catalyst to the polymer solution causes gelation. This is due to crosslinking of the high molecular weight copolymer caused by complexing of the polar groups with the transition metal and metallic species from the reductant employed in catalyst formation. The complexation is an equilibrium process wherein the catalyst can be released into solution by the action of the solvent. In high molecular weight copolymers, only one or two crosslinks per 200–300 monomer units are needed to form a gel or the like. Hence, in spite of the low catalyst level, and catalyst equilibration into the solvent, at any one time the condition for gel formation exists [H. F. Mark, *J. Polymer Sci.Applied Polymer Symposia*, 39, 1 (1984)]. A gelled polymer is difficult to hydrogenate to a high degree due to reduced catalyst mobility and further due to inefficient contact between hydrogen, the catalyst, and the sites of unsaturation derived from the copolymerized hydrocarbon diene. Also, a partially crosslinked polymer results wherein the polar group may undergo partial hydrogenation (see for example, U.S. Pat. No. 3,766,300). Hydrogenation of the polar group would lower the oil resistance of the elastomer. These factors cause the elastomer to be poorer in heat aging and physical properties when compared to the polymers of this invention. In the first two embodiments of the present invention the complexing agents complex with the catalyst in order to prevent the catalyst from excessively bonding to the pyridine rings in the first embodiment of the invention or to the ester functionalities in the second embodiment. Thus, catalyst mobility is improved. The complexing agent allows the catalyst to break away from the polar groups of the polymer and to travel to the less polar sites of unsaturation where hydrogenation should occur. These sites of unsaturation compete efficiently enough for the catalyst (in comparison to the catalyst complexing agent) in order to allow hydrogenation to proceed.

In comparison, in U.S. Pat. No. 3,766,300, catalyst mobility is improved by polymer modification. For example, all of the pyridine nitrogen atoms in a butadiene-b-2-vinylpyridine copolymer were complexed with at least a stoichiometric amount of a Lewis acid (e.g., BF$_3$). The polymer thus modified could be readily hydrogenated. Since the catalyst utilized in the present invention comprises a very small portion (i.e., approximately 1 weight percent) when compared to the weight of the copolymer, it is much more economical to modify the catalyst than the polymer itself as taught in U.S. Pat. No. 3,766,300.

Thus, in accordance with one of the important aspects of the present invention, unexpectedly high degrees of hydrogenation of the copolymer unsaturated olefinic backbone and pendant unsaturation due to the copolymerized hydrocarbon diene are achieved, which saturation improves the heat resistance of the copolymers, without concomitant hydrogenation of the polar groups of the copolymer which would lower the oil-resistance of the copolymer, which is undesirable. Such unexpected results are achieved through the use of the complexing agent for the hydrogenation catalyst which prevents "poisoning" of the catalyst by the polar groups of the copolymer thereby enabling the catalyst to complex with unsaturated sites along the olefinic copolymer backbone to achieve the high levels of hydrogenation thereof. The desired degree of hydrogenation of the copolymers produced in the first two embodiments of the present invention is greater than about 80 percent; desirably greater than about 85 percent; and preferably greater than 95 percent hydrogenation of the unsaturation derived from the copolymerized hydrocarbon diene.

The amount of complexing agent employed is related to the relatively low catalyst level. Generally, the mole ratio of catalyst:complexing agent is from 1:10, preferably 1:8; and most preferably 1:6. The complexing agents for the catalysts are hexamethylphosphoric triamide, tetramethylethylenediamine, phosphines of the general formula $(R_{23})_3P$, phosphites of the general formula $(R_{23}O)_3P$ wherein $R_{23}$ is an alkyl group containing from 1 to about 6 carbon atoms, a phenyl group or a substituted aromatic group wherein the substituent is an alkyl group containing from 1 to about 2 carbon atoms such as o-tolyl.

Solvents for the hydrogenation are well known in the art. An exemplary list of solvents are xylenes, toluenes, anisole, dioxane, tetrahydrofuran, hydrocarbons such as hexanes, heptanes, and octanes and chlorinated hydrocarbons such as chlorobenzene and tetrachloroethane, tri-substituted amines such as triethylamine and tetramethylethylene diamine.

The temperature of hydrogenation is generally from about 25° C. to about 150° C. with from about 25° C. to about 50° C. being preferred.

Removal of the transition metal catalyst is difficult and expensive. This is due to the high molecular weight of the polymer and also that the catalyst is intimately associated with the polymer. A catalyst, when left in contact with the hydrogenated polymer, shows a degradative action. This action is discussed in a paper titled "Rule of Metals and Metal Deactivators in Polymer Degradation," Z. Osawa, *Polymer Degradation and Stability*, 20, 203 (1988). An approach of this invention was the partial removal of the catalyst within the polymer, and also to render the residual catalyst innocuous, that is, to deactivate the catalyst by the addition of a second complexing agent after hydrogenation in the absence of air. If the catalyst is not rendered innocuous, the polymer shows poor heat aging and high oil swell. Some examples of the second complexing agents are weak organic acids containing from 1 to about 4 carbon atoms such as formic acid, acetic acid, and propionic acid; diacids containing from 2 to about 6 carbon atoms such as oxalic acid, malonic acid, succinic acid, glutaric acid, and adipic acid and also sodium or potassium salts of the above mono- or diacids; trisodium ethylenediaminetetraacetate; amino acids of 1 to about 4 carbon atoms such as glycine, alanine, alphaglutaric acid, betaglutaric acid, and gammaglutaric acid; citric acid; pyridine or substituted pyridine wherein the substituent contains 1 to 2 carbon atoms; pyridine carboxylic acids such as nicotinic acid and the corresponding sodium or potassium salts; alkyl or aromatic nitriles containing from 1 to 6 carbon atoms; substituted ureas or thioureas such as N,N-dialkyldithiocarbamate metal salts of 1 to 4 carbon atoms wherein the metal is lithium, sodium, or potassium; sodium or potassium salt of dimethylglyoxime; hexamethylphosphoric triamide; tetramethylethylenediamine; phosphines $P(R_{24})_3$ and phosphites $P(OR_{24})_3$ wherein $R_{24}$ is aliphatic of 1 to 4 carbon atoms or aromatic such as $C_6H_5$, $C_6H_4CH_3$, naphthyl; olefins such as trans-1,2-dichloroethylene; inorganic salts such as cyanides, isocyanates, thiocyanates, thiocyanides, sulfides, hydrosulfides and iodides wherein the metals are sodium or potassium; and hydrogen sulfide as well as any mixtures thereof. A preferred second complexing agent is a solution of acetic acid and pyridine in a weight ratio of from about 7:1 to about 4:1 and most preferably of from about 6:1 to about 5:1.

Previously employed methods for catalyst removal have dealt with coagulation of the polymer solution in dilute aqueous inorganic acid and/or addition of polar organic solvents such as alcohols, ketones, or hot water/steam. When this approach was tried in the first two embodiments of the present invention, the product obtained still contained appreciable quantities of catalyst, resulting in poor heat aging and poor oil resistance of the compounded and cured elastomer derived from this product. The use of dilute aqueous inorganic acids for the first and second embodiments of the present invention resulted in a product with embrittlement, and for the first embodiment only, partial loss of the product in the aqueous acid solution.

EXAMPLE 11

First Embodiment

Under nitrogen, 100 grams of the product of Example 1 was dissolved in several portions in one-half gallon of dry tetrahydrofuran in a one gallon high pressure reactor equipped with a paddle stirrer. The copolymer was completely dissolved in about four hours.

Preparation of the Hydrogenation Catalyst Solution

Under argon, a solution of 8.3 grams (12 weight percent) of cobalt (II) neodecanoate in mineral spirits and 17.5 grams hexamethylphosphoric triamide was prepared and cooled by means of an ice bath to about 3° C. To this purple solution was added, drop-wise, 26.7 grams triethylaluminum (25 weight percent, 1.9 molar solution) reductant in toluene. Evolution of gases occurred and the purple solution turned brown upon the addition of the triethylaluminum solution. After the addition of the triethylaluminum, a hydrogenation catalyst solution was stirred under nitrogen for one hour at room temperature.

The hydrogenation catalyst was then added slowly to the stirred copolymer solution under nitrogen followed by the introduction of hydrogen (500 psi). Periodically, the reactor was repressurized to 500 psi in order to compensate for hydrogen uptake by the polymer. When hydrogen uptake at room temperature ceased, the polymer solution was heated to 50° C. and the hydrogen pressure increased to 1000 psi. Again, repressurization was continued to compensate for hydrogen uptake by the polymer. After a total time of about six hours, hydrogen uptake stopped. The polymer solution was then cooled to room temperature. Excess hydrogen was vented and replaced with a nitrogen blanket. A solution of glacial acetic acid (200 grams) and pyridine (40 grams), deoxygenated by bubbling in nitrogen was then added under nitrogen to the polymer solution. After stirring for one hour at room temperature, the polymer solution was coagulated in hot (70° C.) water, filtered and dried in air (100° C., four hours), followed by drying in vacuum (80° C., 1 mm Hg, two hours).

The action of acetic acid/pyridine solution on the cobalt ions under anaerobic conditions was important in rendering the residual cobalt catalyst (intimately mixed in with the polymer) innocuous to polymer degradation. Without the acetic acid treatment, the hydrogenated polymer exhibits poor heat aging and high oil swell in hydrocarbon oils. When acetic acid/pyridine solution is added to the solution of the hydrogenated polymer in the presence of air, prior to polymer coagulation, heat aging is not improved.

The hydrogenated random copolymer of Example 11 is compounded and evaluated in a side-by-side comparison with a nitrile rubber available from Nippon-Zeon having 36 weight percent acrylonitrile. The control Example 12 and the invention Example 13 are both cured with sulfur. The evaluation is set out in Table V. All values are parts by weight.

TABLE V

| | Example 12 Control | Example 13 Present Invention |
|---|---|---|
| Stearic Acid | 1 | 1 |
| Zinc Oxide | 5 | 5 |
| Vanox ZMTI | 2 | 2 |
| Nangard 445 | 2 | 2 |
| N550 Block | 50 | 50 |
| Spider Sulfur | .2 | .2 |
| Methyl Tuads, TMTD | 1.5 | 1.5 |
| Ethyl Tuads, TETD | 1.5 | 1.5 |
| Santocure, CBTS | 1.0 | 1.0 |
| Zippon-Zeon Nitrile Rubber | 100.00 | |
| Product of Example 6 | | 100.00 |
| Rheometer (190° C., 3° Arc, 100 cpm, Micro Die) | | |
| ML (lbf. in) | 10.0 | 5.1 |
| MHF (lbf. in) | 58.6 | 38.6 |
| $T_s2$ (min.) | 1.5 | 0.9 |
| T'90 (min.) | 2.7 | 1.7 |
| Cure Time (min.) | 4.0 | 4.0 |
| Cure Time (min.) | 6.0[a] | 6.0[a] |
| Original Properties (Cured at 190° C.) | | |
| Stress at 100% (psi) | 383 | 383 |
| Stress at 200% (psi) | 732 | 759 |
| Stress at 300% (psi) | 1161 | 1234 |
| Tensile Strength (psi) | 2736 | 2939 |
| Elongation, Ultimate (%) | 850 | 788 |
| Hardness, Shore A (pts) | 71 | 70 |
| Compression Set (ASTM D395, Method B, 70 hr, 150° C.) | | |
| Set (%) | 90.1 | 85.1 |
| Gehman Low Temperature Torsion Test | | |
| Freeze Point (°C.) | −26 | −26 |
| ASTM #3 Oil (170 hr. 150° C.) | | |
| Volume Change (%) | 19 | 19 |
| Air Test Tube (70 hr. 175° C.) | | |
| Tensile, Ultimate (psi) | 2815 | 2792 |
| Tensile Change (%) | 3 | −5 |
| Elongation, Ultimate (%) | 399 | 386 |

TABLE V-continued

| | Example 12 Control | Example 13 Present Invention |
|---|---|---|
| Elongation Change (%) | −53 | −51 |
| Hardness, Shore A (pts) | 80 | 80 |
| Hardness Change (pts) | +0 | +10 |

[a]Tempered (4 hr, 177° C.)

The hydrogenated random copolymer of Example 11 is compounded and evaluated in a side-by-side comparison with a nitrile rubber available from Nippon/Zeon having 36 weight percent acrylonitrile. The control Example 14 and the Invention Example 15 are both cured with peroxide. The evaluation is set out in Table VI. All values are parts by weight.

TABLE VI

| | EXAMPLE 14 CONTROL | EXAMPLE 15 PRESENT INVENTION |
|---|---|---|
| Structol WB-222 | 2.0 | 2.0 |
| Stearic Acid | 1.0 | 1.0 |
| AgeRite Stalite S | 2.0 | 2.0 |
| N550 Block | 40.0 | 80.0 |
| Ricon 153D | 4.0 | 4.0 |
| Vulcup 40KE | 10.0 | 10.0 |
| Tetrono A | 0.1 | 0.1 |
| Product of Example 6 | — | 100.0 |
| Nippon-Zeon Nitrile Rubber | 100.00 | — |
| Mooney Viscometer (125° C., Large Rotor) | | |
| Minimum Viscosity | 54.6 | 39.0 |
| $T_5$ (min) | >35 | >35 |
| $T_{35}$ (min) | >35 | >35 |
| Rheometer (190° C., 3° C. Arc, 100 cpm, Micro Die) | | |
| ML (lbf. in) | 12.7 | 4.9 |
| MHF (lbf. in) | 127.3 | 30.6 |
| $T_s2$ (min.) | 0.9 | 1.2 |
| T'90 (min.) | 3.5 | 4.0 |
| Cure Time (min) | 4.0 | 4.0 |
| Cure Time (min) (Compression Set Buttons) | 6.0 | 6.0 |
| Cure Time (min) (Plied discs) | 4.0 | 4.0 |
| Original Properties (Cured at 190° C.) | | |
| Stress at 100% (psi) | 650 | 550 |
| Stress at 300% (psi) | — | 3100 |
| Tensile Strength (psi) | 3680 | 3500 |
| Elongation, Ultimate (%) | 300 | 350 |
| Hardness, Duro A (pts) | 70 | 69 |
| Gehman Low Temperature Torsion Test | | |
| Freeze pt. (°C.) | −30.7 | −30.7 |
| ASTM #3 Oil (70 hr, 150° C.) | | |
| Tensile, Ultimate (%) | 31.25 | 3177 |
| Tensile Change (%) | −15 | −9 |
| Elongation, Ultimate (%) | 290 | 309 |
| Elongation Change (%) | −3 | −11 |
| Hardness, Shore A (pts) | 60 | 60 |
| Hardness Change (pts) | −10 | −9 |
| Volume Change (%) | 18 | 18 |
| Air Test Tube (70 hr, 175° C.) | | |
| Tensile, Ultimate (psi) | 1756 | 1789 |
| Tensile Change (%) | −52 | −49 |
| Elongation, Ultimate (%) | 108 | 112 |
| Elongation Change (%) | −64 | −68 |
| Hardness, Shore A (pts) | 75 | 75 |
| Hardness Change (pts) | 5 | 6 |

EXAMPLE 15a

A sample of hydrogenated butadiene/2-vinylpyridine copolymer was made as in Example 11, except using cobalt (II) octoate instead of cobalt (II) neodecanoate as the transition metal catalyst component. Formula $A_u$ represents the unhydrogenated starting material, and formula $A_h$ the hydrogenated product.

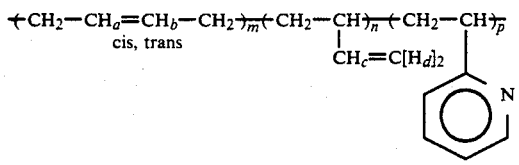

Formula $A_u$

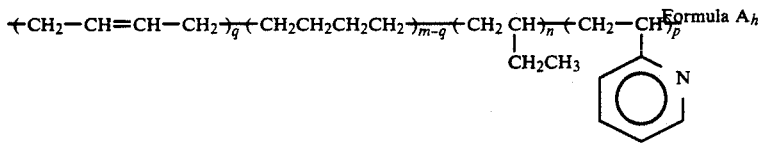

Formula $A_h$

Figure 2:
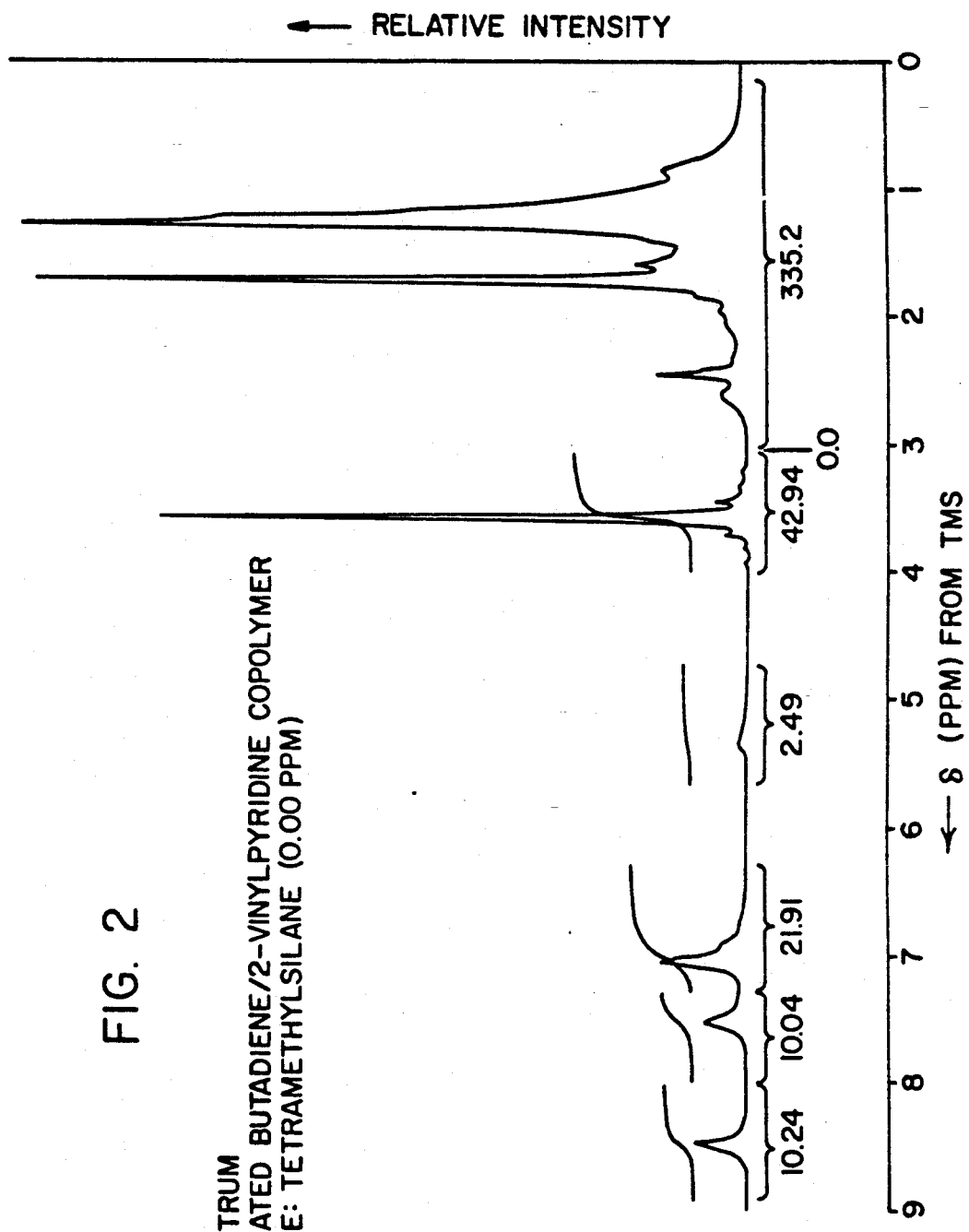
FIG. 2 is a graph of the proton magnetic resonance spectrum of the hydrogenated butadiene/2-vinylpyridine copolymer.

The proton magnetic resonance spectrum of the unhydrogenated starting material of Formula $A_u$ and the hydrogenated copolymer of Formula $A_h$ above were recorded in FIGS. 1 and 2, respectively. The results shown in FIG. 1 for the unhydrogenated butadiene/2-vinylpyridine copolymer of Formula $A_u$ are set forth below in Table VIa.

TABLE VIa

| Absorption (ppm) | Origin |
|---|---|
| 0.75–3.00 | Aliphatic protons (i.e., hydrogen atoms attached to saturated carbon atoms) |
| 1.75 | Residual protons in tetrahydrofuran -$d_8$ used as the PMR solvent |
| 3.60 | |
| 4.50–5.04 | Protons $H_d$ from butadiene copolymerized in a 1,2 fashion |
| 5.04–5.80 | Protons $H_a$, $H_b$ from butadiene copolymerized in a 1,4 fashion and proton $H_c$ from butadiene copolymerized in a 1,2 fashion |
| 6.45–8.70 | Aromatic protons of the pyridine ring |

Calculation Of Mole Percent of Copolymerized 2-Vinylpyridine (formula $A_u$ and FIG. 1)

Area represented by one $H_d$ proton $= 10.45/2 = 5.22$.

Area represented by one $H_a$ proton $=$ (area of $H_a$, $H_b$, $H_c$ protons $-$ area of $H_c$ proton)/2.

The area of the $H_c$ proton and one of the $H_d$ protons are equal.

Therefore, the area represented by one $H_a$ proton is $(63.86 - 5.22)/2 = 29.32$.

Total area representing moles of butadiene in the copolymer is $29.32 + 5.22 = 34.54$.

Total area representing moles of 2-vinylpyridine in the copolymer is $(14.28 + 15.16 + 27.57)/4 = 14.25$.

Mole percent of 2-vinylpyridine copolymerized $$= \frac{14.25}{(14.25 \times 35.54)} \times 100 = 29.2 \text{ percent.}$$

Check of Area in the Aliphatic Proton Region

Area expected $= 3 \times$ area of 1 $H_d$ $+ 4 \times$ area of $1 H_a + 3 \times$ area of 1 aromatic proton $= 3 \times 5.22 + 4 \times 29.32 + 3 \times 14.25 = 175.69$.

Area observed $= 218.99 -$ (contribution from tetrahydrofuran) $= 218.99 - 25.8 = 193.19$  (tetrahydrofuran makes equal contribution to the area at 1.75 and 3.60 ppm).

Thus, the above calculations show that the proton magnetic resonance spectrum of FIG. 1 is accurate.

The proton magnetic resonance spectrum of the hydrogenated butadiene/2-vinylpyridine copolymer of Formula $A_h$ is interpreted in Table VIb below.

TABLE VIb

| Absorption (ppm) | Origin |
|---|---|
| 0.13–2.89 | Aliphatic protons (i.e., hydrogen atoms attached to saturated carbon atoms) |
| 1.8 | Residual tetrahydrofuran in copolymer and residual protons in tetrahydrofuran -$d_8$ used as the pmr solvent. |
| 3.65 | |
| 5.06–5.48 | Protons $H_a$, $H_b$ from residual unsaturation |
| 6.43–8.70 | Aromatic protons of the pyridine ring |

It can be seen from FIG. 2, that olefinic protons $H_d$, and hence protons $H_c$, are absent in the hydrogenated product (no absorption at 4.5–5.04 ppm observed in the starting material). Thus, the residual unsaturation observed is due to the butadiene copolymerized in a 1,4 manner, that is, this trace absorption is assigned to the C—H olefinic protons or hydrogen atoms attached to unsaturated carbon atoms of unit q (formula $A_h$).

CALCULATION OF MOLE PERCENT BUTADIENE UNHYDROGENATED

Area represented by moles of residual butadiene unit in copolymer $= 2.49/2 = 1.24$.

Aliphatic area contribution from residual butadiene unit $= 1.24 \times 4 = 4.96$.

Area represented by moles of 2-vinylpyridine copolymerized $(21.9 + 10.84 + 10.24);4 = 10.75$.

Aliphatic area from copolymerized 2-vinylpyridine $= 3 \times 10.75 = 32.25$.

Aliphatic area observed $= 335.2 -$ area due to tetrahydrofuran $= 335.2 - 42.94 = 292.26$.

Area due to saturated butadiene segments $= 292.26 - 32.25 - 4.96 = 255.05$

Area representing the moles of saturated butadiene unit $= 255.05/8 = 31.88$. Mole percent unsaturation:

$$\frac{1.24}{(1.24 + 10.75 + 31.88)} \times 100 = 2.8 \text{ percent}$$

or

-continued $$\frac{(1.24)54}{(1.24)54 + (10.75)105 + (31.88)56} = 2.2 \text{ wt. percent}$$

Thus, the copolymer of Formula $A_h$ was hydrogenated to 97.8 percent by weight.

| Molecular weight | |
|---|---|
| Butadiene unit | 54 |
| Saturated butadiene unit | 56 |
| 2-Vinylpyridine unit | 105 |

Mole percent of 2-vinylpyridine in the copolymer is $$\frac{10.75}{(1.24 + 10.75 + 31.80)} \times 100 = 24.5 \text{ percent,}$$

which compares well with the 29.2 mole percent calculated for the starting material. Hence, the pyridine ring has been unaffected by the hydrogenation process. Thus, the polar character of the copolymer, and hence the oil-resistance of the elastomer, is unaffected by the hydrogenation process.

Figure 3:
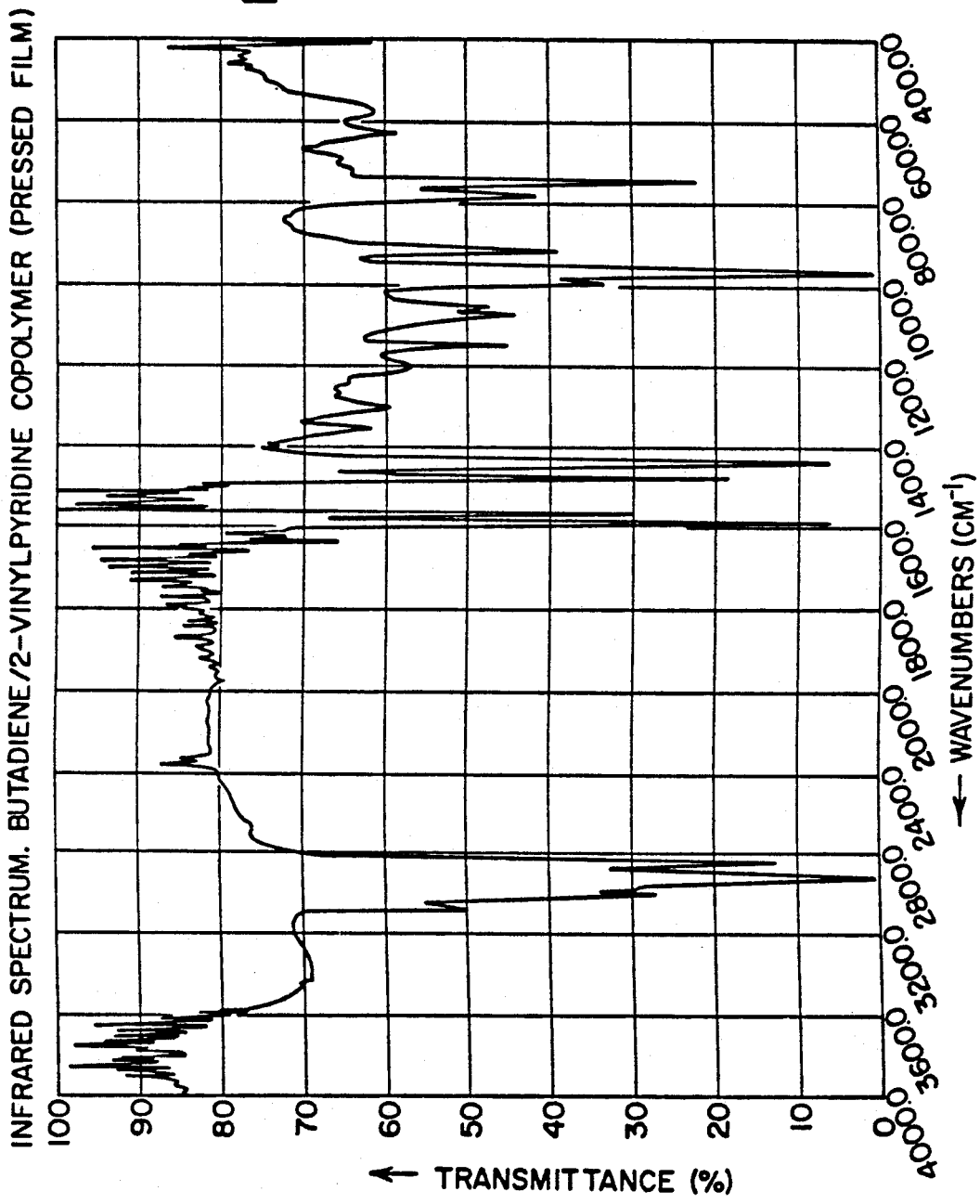
FIG. 3 is a graph of the infrared spectrum of the unhydrogenated butadiene/2-vinylpyridine copolymer.
Figure 4:
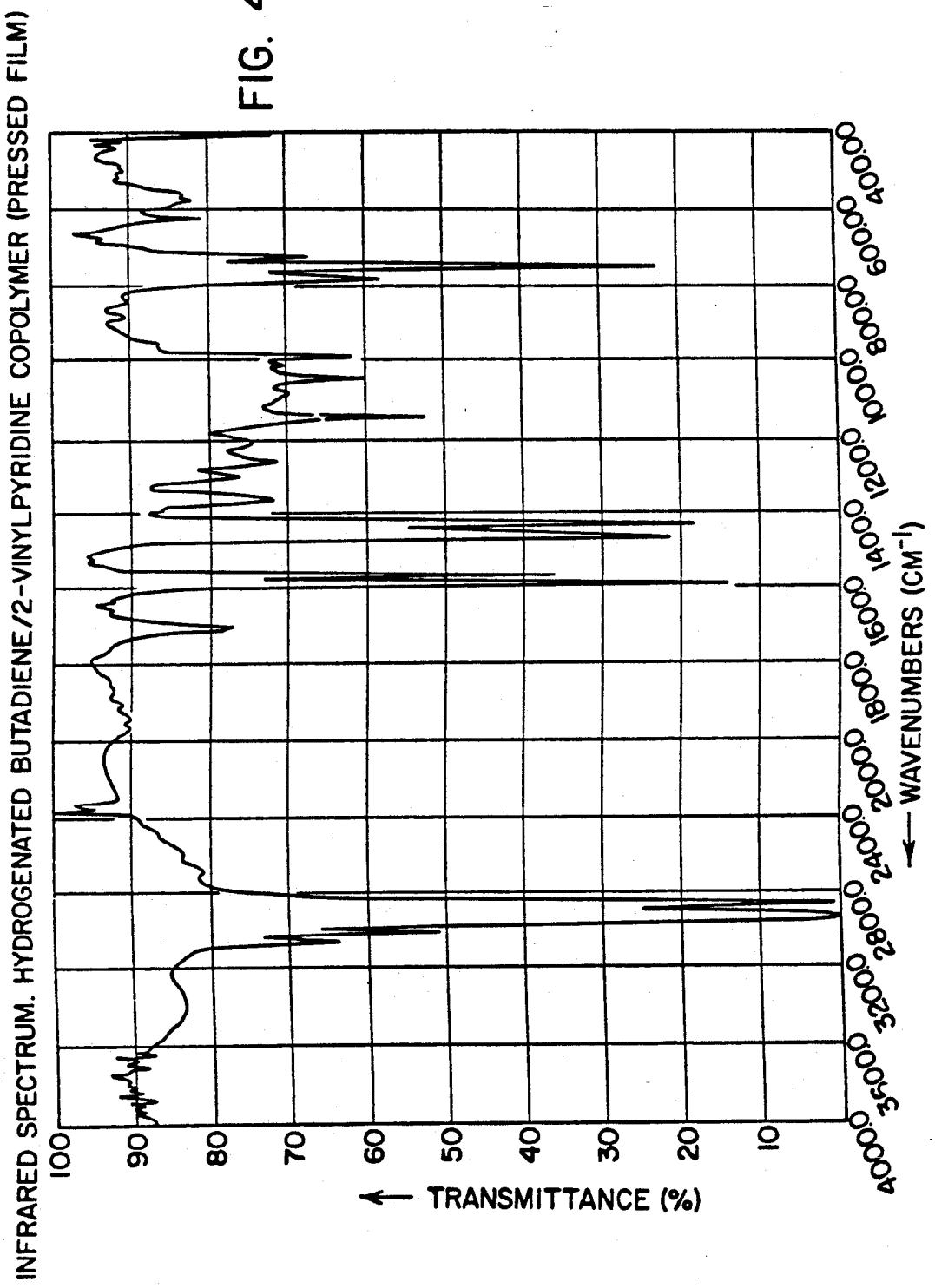
FIG. 4 is a graph of the infrared spectrum of the hydrogenated butadiene/2-vinylpyridine copolymer.

The infrared spectrum of the unhydrogenated butadiene/2-vinylpyridine copolymer is compared with the hydrogenated butadiene/2-vinylpyridine copolymer of Example 11 in FIGS. 3 and 4 respectively, and indicates for the hydrogenated polymer the absence of absorptions at 970 and 915 cm$^{-1}$ which ordinarily result from the olefinic carbon-hydrogen out-of-plane bend (trans 1,4 copolymerized and 1,2 copolymerized butadiene, respectively). Hence, the backbone and pendant unsaturation have been completely or 100 percent saturated, and only the vinylpyridine group of the hydrogenated copolymer remains unsaturated, which is desirable. More particularly, the characteristic absorption (1590-1430 cm$^{-1}$) due to the pyridine ring remains unaffected by the hydrogenation process as shown in FIGS. 3 and 4. Thus, the polar character of the copolymer, and hence the oil-resistance, is retained in the hydrogenated copolymer.

The hydrogenated polymer of Example 11 was analyzed for cobalt by ashing the sample, solubilization of the metals in the ashed sample with acid, and measuring the metal concentration by atomic absorption. The cobalt concentration was found to be 118 ppm.

When the procedure of Example 11 was repeated, and the hydrogenated solution was worked up with glacial acetic acid only (150 ml) in the absence of air, the cobalt concentration in the isolated copolymer was reduced greatly by coagulating the polymer solution, with vigorous stirring, in extremely dilute (0.45 wt percent) aqueous HCl. The catalyst dissolved in the aqueous phase (cobalt 21 ppm and aluminum 35 ppm in the isolated rubber). Thus, the use of glacial acetic acid alone, results in more efficient removal of the cobalt catalyst. Using a more concentrated aqueous solution (5 wt. percent aqueous HCl) resulted in dissolution of part of the polymer and in the isolation of a cross-linked, brittle product. Thus, desirably from about 0.1 to about 2.0 percent aqueous HCl is used, preferably from about 0.25 to about 1.0 percent, and most preferably about 0.45 percent. It is understood that inorganic acids other than HCl, such as nitric acid or sulfuric acid at the same dilute weight percent levels, could also be utilized with similar results.

EXAMPLE 16

Second Embodiment

Under nitrogen, 100 grams of the product of Example 6 was dissolved in several portions in one-half gallon of dry tetrahydrofuran in a one-gallon high pressure reactor equipped with a paddle stirrer. The copolymer was completely dissolved in about four hours.

Preparation of the Hydrogenation Catalyst Solution

Under argon, a solution of 8.3 grams (12 weight percent) of cobalt (II) neodecanoate in mineral spirits and 17.5 grams hexamethylphosphoric triamide was prepared and cooled by means of an ice bath to about 3° C. To this purple solution was added, drop-wise, 26.7 grams of triethylaluminum (25 weight percent, 1.9 molar solution) reductant in toluene. Evolution of gases occurred and the purple solution turned brown upon the addition of the triethylaluminum catalyst. After the addition of the triethylaluminum catalyst solution, a hydrogenation catalyst solution was stirred under nitrogen for one hour at room temperature.

The hydrogenation catalyst was then added slowly to the stirred copolymer solution under nitrogen followed by the introduction of hydrogen (500 psi). Periodically, the reactor was repressurized to 500 psi in order to compensate for hydrogen uptake by the polymer. When hydrogen uptake at room temperature ceased, the polymer solution was heated to 50° C. and the hydrogen pressure increased to 1000 psi. Again, repressurization was continued to compensate for hydrogen uptake by the polymer. After a total time of about six hours, hydrogen uptake stopped. The polymer solution was then cooled to room temperature. Excess hydrogen was vented and replaced with a nitrogen blanket. A solution of glacial acetic acid (200 grams) and pyridine (37 grams) was deoxygenated with nitrogen and then added to the polymer solution. After stirring for one hour at room temperature, the polymer solution was coagulated in hot (70° C.) water, filtered and dried in air (100° C., four hours), followed by drying in vacuum (80° C., 1 mm Hg, two hours).

Figure 5:
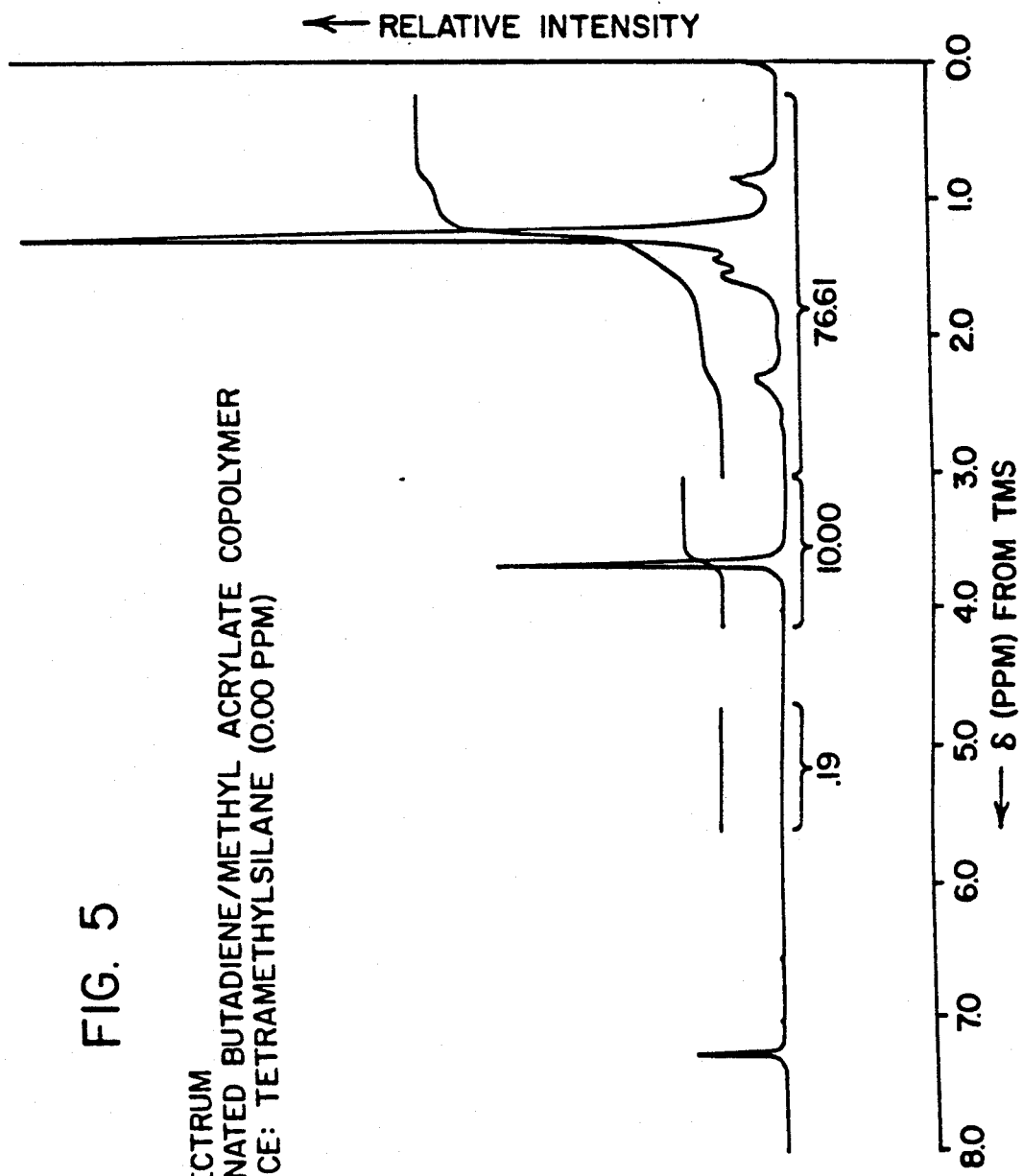
FIG. 5 is a graph of the proton magnetic resonance spectrum of the nydrogenated butadiene/methyl acrylate copolymer.

The proton magnetic resonance spectrum of the hydrogenated butadiene methyl acrylate copolymer is shown in FIG. 5. FIG. 5 indicates only a trace of absorption in the olefinic proton region (5-6 ppm). Hence, the copolymer is essentially 100 percent hydrogenated. The starting material can be represented by formula $B_u$ and the hydrogenated material is represented by formula $B_h$.

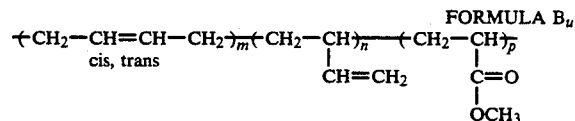

FORMULA $B_u$

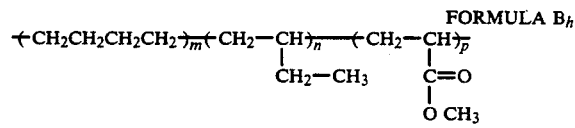

FORMULA $B_h$

FIG. 5 is interpreted below in Table VIc.

TABLE VIc

| Absorption (ppm) | Origin |
|---|---|
| 0.60-2.80 | Aliphatic protons (i.e., |

TABLE VIc-continued

| Absorption (ppm) | Origin |
|---|---|
| 3.35–3.95 | hydrogen atoms attached to saturated carbon atoms $-\overset{\overset{O}{\|}}{C}-O\ CH_3$ protons of ester group |
| 5.36 (trace) | Residual unsaturation |
| 7.26 | From chloroform in chloroform-d pmr solvent |

Calculation Of Mole Percent Copolymerized Methyl Acrylate

Area representing moles of methyl acrylate = 10.00/3 or 3.33.

Aliphatic area resulting from copolymerized methyl acrylate = 3×3.33 = 10.00 (see Formula $B_u$).

Therefore, the aliphatic area from hydrogenated butadiene segments = (observed area) = 10.00 or 76.61 − 10.00 = 66.61.

Hence, area representing moles of hydrogenated butadiene segments = 66.61/8 = 8.32

Mole percent of copolymerized methyl acrylate $$= \frac{3.33}{3.33 \times 8.32} \times 100 = 28.6 \text{ percent}$$

or $$\frac{3.33 \times 86}{(3.33 \times 86) + (8.32 \times 56)} \times 100 = 38 \text{ wt. percent}$$

The molecular weight of copolymerized methyl acrylate is 86 and that of the hydrogenated butadiene segments is 56.

Figure 6:
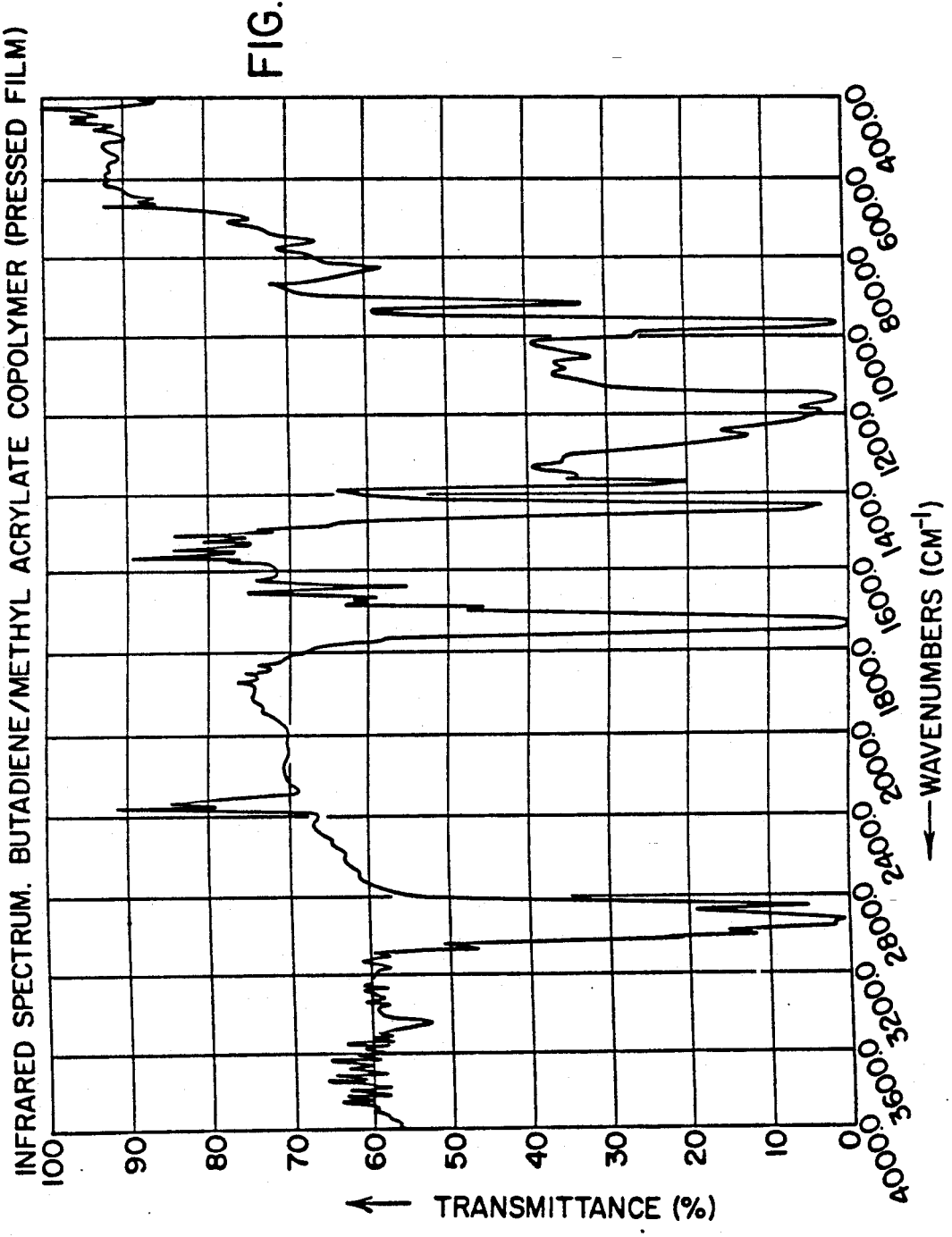
FIG. 6 is a graph of the infrared spectrum of the unhydrogenated butadiene/methyl acrylate copolymer.
Figure 7:
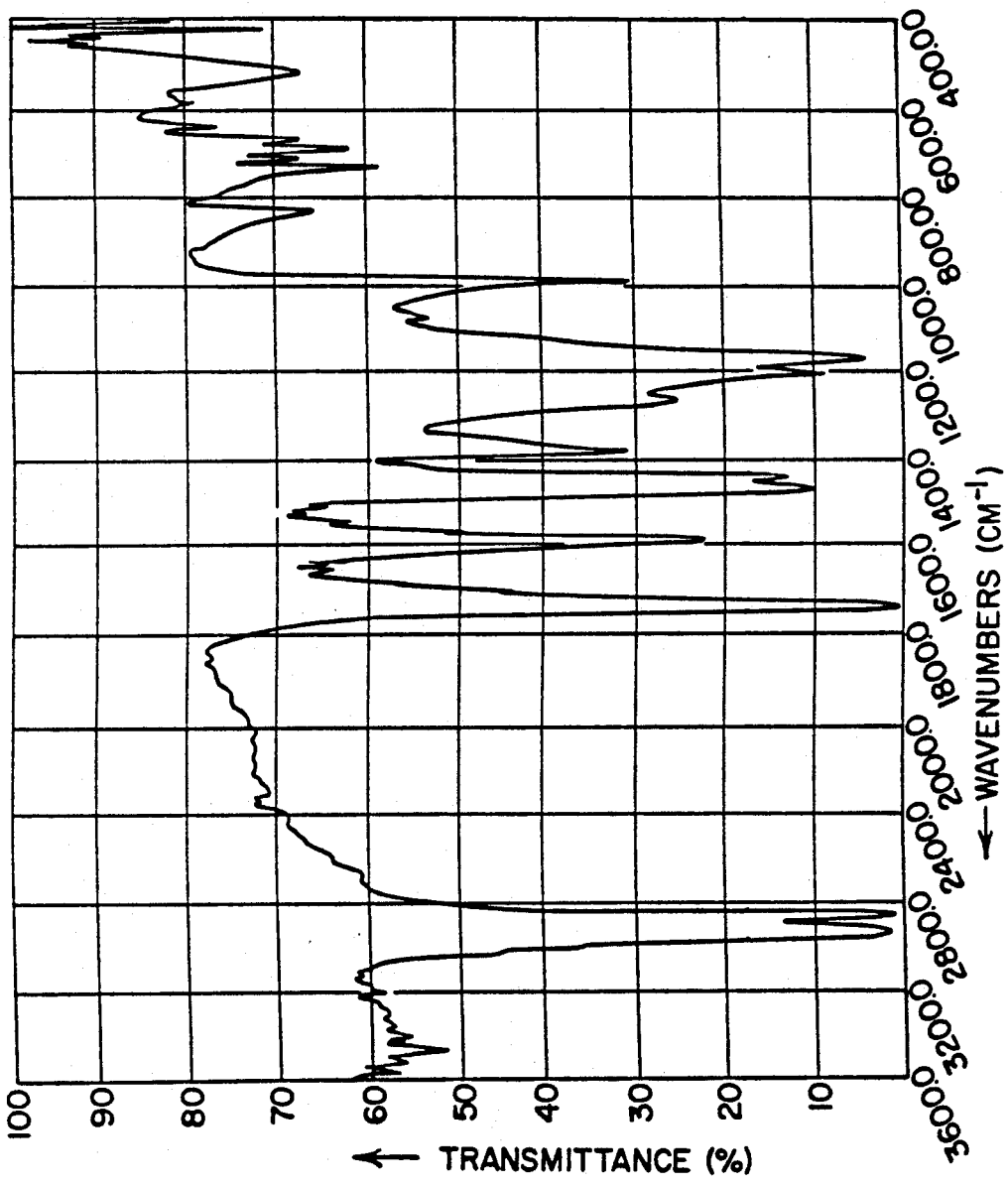
FIG. 7 is a graph of the infrared spectrum of the hydrogenated butadiene/methyl acrylate copolymer.

The infrared spectrum of the starting material, see FIG. 6, when compared with that of the hydrogenated copolymer, see FIG. 7, confirms the conclusions reached by analysis of the proton magnetic resonance spectrum. The bands at 970 and 915 cm$^{-1}$ in the starting material are completely absent in that of the product.

The absorption at 970 cm$^{-1}$ originates from the olefinic carbon-hydrogen out-of-plane bend due to the trans 1,4 copolymerized butadiene unit, and that at 915 cm$^{-1}$ from the carbon-hydrogen out-of-plane bend due to the butadiene units copolymerized in a 1,2 fashion. The C=O stretching frequency of the ester carbonyl group remains unchanged at 1740 cm$^{-1}$ in the hydrogenated copolymer. Thus, the polar character of the copolymer, and hence the copolymer oil-resistance, is unaffected by the hydrogenation process.

EXAMPLE 17

Second Embodiment

This is a repeat of 16 except that the acetic acid-pyridine solution is added to the hydrogenated polymer in the presence of air rather than under anaerobic conditions.

The action of acetic acid and pyridine on the cobalt ions under anaerobic conditions was important in rendering the residual cobalt catalyst (intimately mixed in with the polymer) innocuous to polymer degradation. Without the acetic acid-pyridine treatment, the hydrogenated polymer exhibits poor heat aging and high oil swell in hydrocarbon oils. When acetic acid-pyridine is added to the solution of the hydrogenated polymer in the presence of air, prior to polymer coagulation, heat aging is not improved.

The hydrogenated random copolymers of Examples 16 and 17 are compounded with plasticizer, processing aids, amine anti-oxidant, curing agents and sulfur donors. These examples are evaluated as Examples 18 and 19, respectively in Table VII.

TABLE VII

| | AGING: ENVIRONMENT: AIR OVEN; 70 HR., 175° | | | | | |
|---|---|---|---|---|---|---|
| | Tensile, psi | Tensile, change, % | Elongation % | Elongation change, % | Hardness A, pts. | Hardness A, change, pts |
| Example 18 (Compounded product of Example 16, anaerobic conditions) | 2155 | 6 | 83 | −55 | 90 | 11 |
| Example 19 (Compounded product of Example 17, non-anaerobic conditions) | 1930 | −22 | 50 | −72 | 89 | 11 |

EXAMPLE 19a

A butadiene/2-methoxyethyl acrylate copolymer was synthesized as per Example 6, starting with 40 parts of butadiene and 60 parts of 2-methyoxyethyl acrylate. The isolated rubber exhibited a glass transition temperature of −60° C. and a Mooney viscosity of 37 (ML[4,100° C.]).

The polymer was hydrogenated and isolated as described in Example 16, except for the use of cobalt (II) octoate as the transition metal component for catalyst formation instead of cobalt (II) neodecanoate. Formulas $C_u$ and $C_h$ represent the starting material and product, respectively.

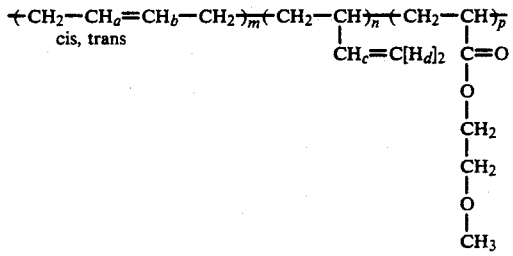

FORMULA $C_u$

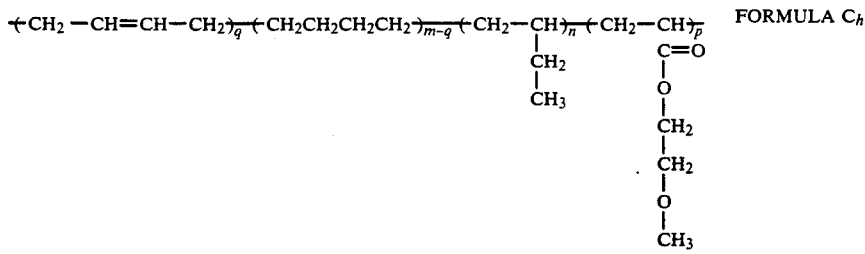

FORMULA $C_h$

Figure 8:
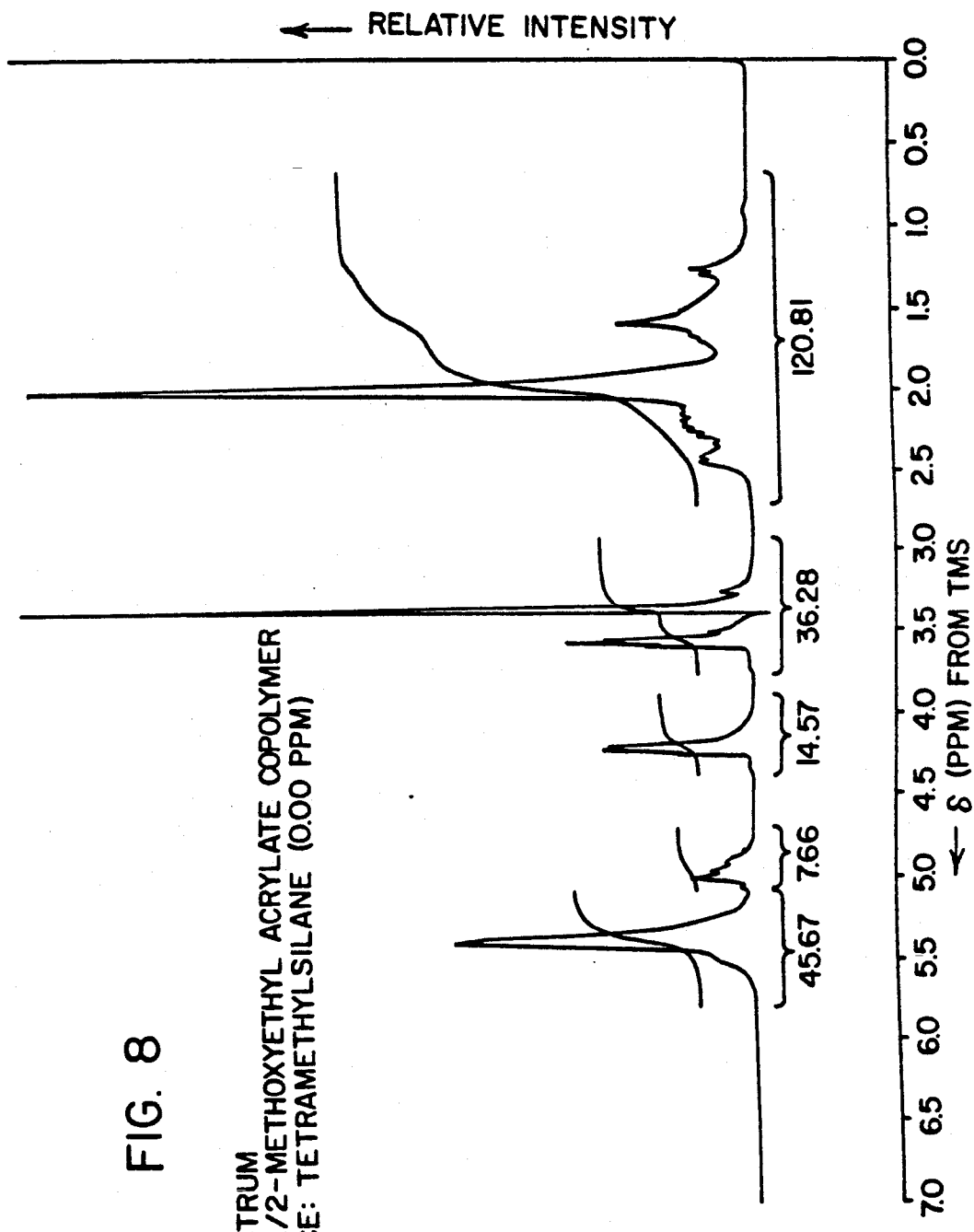
FIG. 8 is a graph of the proton magnetic resonance spectrum of the unhydrogenated butadiene/2-methoxyethyl acrylate copolymer.

Analysis of the proton magnetic resonance spectrum of the starting material (FIG. 8) and product (FIG. 9) is detailed below in Tables VIIa and VIIb, respectively.

TABLE VIIa

| Absorption (ppm) | Origin |
|---|---|
| 0.66–2.60 | Aliphatic protons (i.e., hydrogen atoms attached to saturated carbon atoms) |
| 2.95–3.40 | —O—CH$_3$ protons of ester group |
| 3.40–3.76 | $-\overset{\overset{O}{\|}}{C}-O-C-CH_2-O-$ protons ester group |
| 3.90–4.38 | $-\overset{\overset{O}{\|}}{C}-O-CH_2-C-O-$ protons of ester group |
| 4.70–5.06 | Protons H$_d$ from butadiene copolymerized in a 1,2 fashion |
| 5.06–5.80 | Protons H$_a$, H$_b$ from butadiene copolymerized in a 1,4 fashion and proton H$_c$ from butadiene copolymerized in a 1,2 manner |

Calculation of the Mole Percent of Copolymerized 2-Methoxyethyl Acrylate

The absorption from 2.95–4.38 ppm, with a total area of 50.85 (36.28+14.57), represent the seven protons of the 2-methyoxyethyl group $$(-\overset{\overset{O}{\|}}{C}-O-CH_2-CH_2-OCH_3).$$

Hence, the moles of copolymerized 2-methoxyethyl acrylate is represented by an area of 50.85/7=7.26.

For the copolymerized butadiene segment, each H$_d$ proton is represented by an area of 7.66/2 or 3.83.

Protons H$_a$ and H$_b$ are represented by (total area of H$_a$, H$_b$, H$_c$—area of H$_c$ [=area of H$_d$]) or 45.67−3.83=41.84. Therefore, one H$_a$ proton is represented by an area of 41.84/2 or 20.92.

The moles of copolymerized butadiene is represented by 3.83+20.92=24.75.

Mole percent of copolymerized 2-methoxyethyl acrylate is $$\frac{7.26}{7.26 + 24.75} \times 100 \text{ or } 22.7,$$

which corresponds to $$\frac{7.26 \times 114}{(7.26 \times 114) + (24.75 \times 54)} \times 100 = 38.2 \text{ wt. percent}$$

Molecular weight of 2-methoxyethyl acrylate is 114, and that of butadiene is 54.

Check of area in the aliphatic region. Expected area (Formula $C_u$)=(3× area representing copolymerized 2-methoxyethyl acrylate)+(3× area representing 1 H$_d$ proton)+(4× area representing 1 H$_a$ proton)=(3×7.26)+(3×3.83)+(4×20.92)=117.

Figure 9:
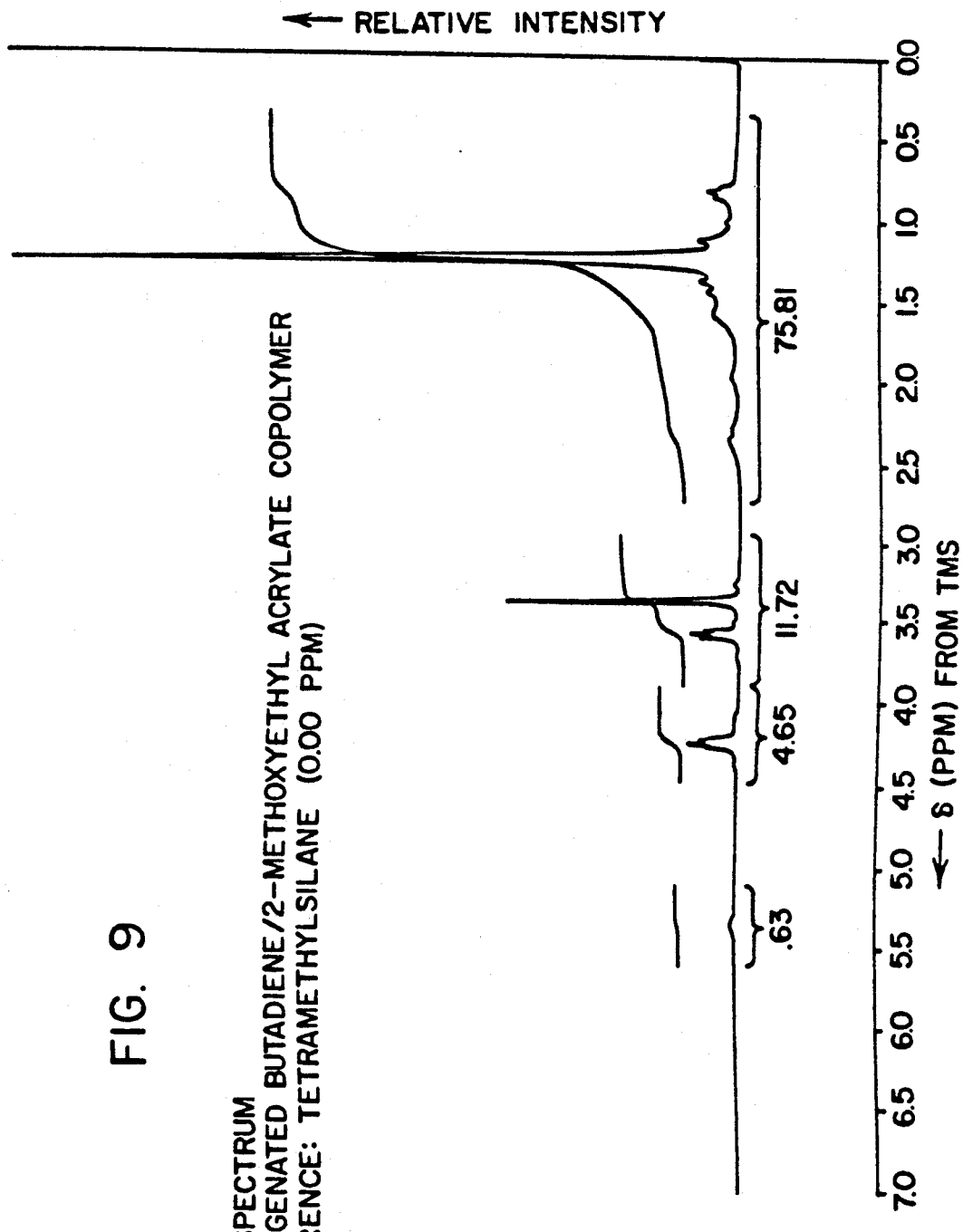
FIG. 9 is a graph of the proton magnetic resonance spectrum of the hydrogenated butadiene/2-methoxyethyl acrylate copolymer.

This compares well with the observed area of 121. Thus, the proton magnetic resonance spectrum of FIG. 9 is accurate.

TABLE VIIb

| Absorption (ppm) | Origin |
|---|---|
| 0.6–2.74 | Aliphatic protons (i.e., hydrogen atoms attached to saturated carbon atoms) |
| 3.10–3.47 | —O—CH$_3$ protons of ester group |
| 3.47–3.75 | $-\overset{\overset{O}{\|}}{C}-O-C-CH_2-O$ protons of ester group |
| 4.00–4.40 | $-\overset{\overset{O}{\|}}{C}-O-CH_2-C-O-$ protons of ester group |
| 5.3–5.45 | Olefinic C—H protons due to residual unsaturation from butadiene copolymerized in a 1,4 manner |

Calculation of the Mole Percent of Unhydrogenated Butadiene Segment in Polymer

Figure 10:
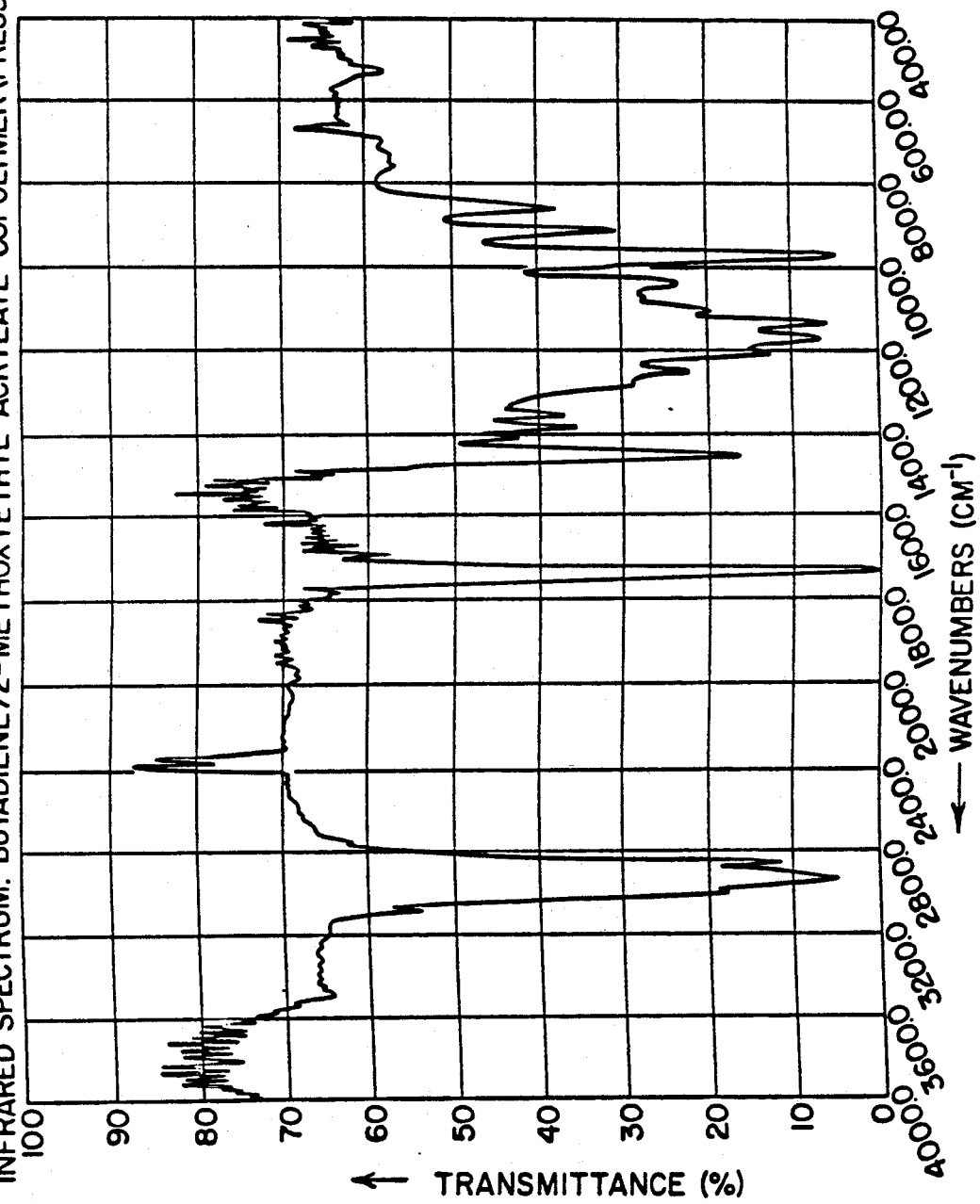
FIG. 10 is a graph of the infrared spectrum of the unhydrogenated butadiene/2-methoxyethyl acrylate copolymer.

The absence of any signals in the 4.70–5.06 ppm region of FIG. 10 indicates that unsaturation resulting from butadiene copolymerized in a 1,2 fashion has been completely or 100 percent hydrogenated.

Residual moles of butadiene copolymerized in a 1,4 fashion is represented by an area of 0.63/2 or 0.31.

The aliphatic contribution due to this residual unsaturation is represented by an area of 0.31×4 or 1.24 (Formula $C_h$).

Area representing moles of copolymerized 2-methoxyethyl acrylate is $$(4.65 + 11.72)/7$$

or 2.34.

Aliphatic contribution from the copolymerized 2-methoxyethyl acrylate is represented by 2.34×3 or 7.02.

Therefore, the area representing the hydrogenated butadiene segments is (area in the 0.6-2.74 ppm range)=(1.24+7.02) or 75.81−(1.24+7.02)=67.55.

Area representing the moles of hydrogenated butadiene is 67.55/8 or 8.44.

Mole percent unsaturation=

$$\frac{0.31}{0.31 + 2.34 + 8.44} \times 100$$

= 2.8 percent or $$\frac{0.31 \times 54}{(0.31 \times 54) + (2.34 \times 114) + (8.44 \times 56)} \times 100 =$$

2.2 wt percent

Thus, the butadiene/methoxyethyl acrylate copolymer is hydrogenated to 97.8 percent by weight of the copolymer. The molecular weight of copolymerized butadiene is 54, that of the hydrogenated butadiene segment 56, and that of copolymerized 2-methoxyethyl acrylate 114.

The mole percent of 2-methoxyethyl acrylate is $$\frac{2.34}{(2.34 + 0.31 + 8.44)} \times 100$$

or 21.1 which compares well with the 22.7 percent calculated for the starting copolymer. This confirms that the ester groups in the copolymer are not hydrogenated. Thus, the polar character of the elastomer, and hence elastomer oil-resistance, is retained in the hydrogenated product.

Figure 11:
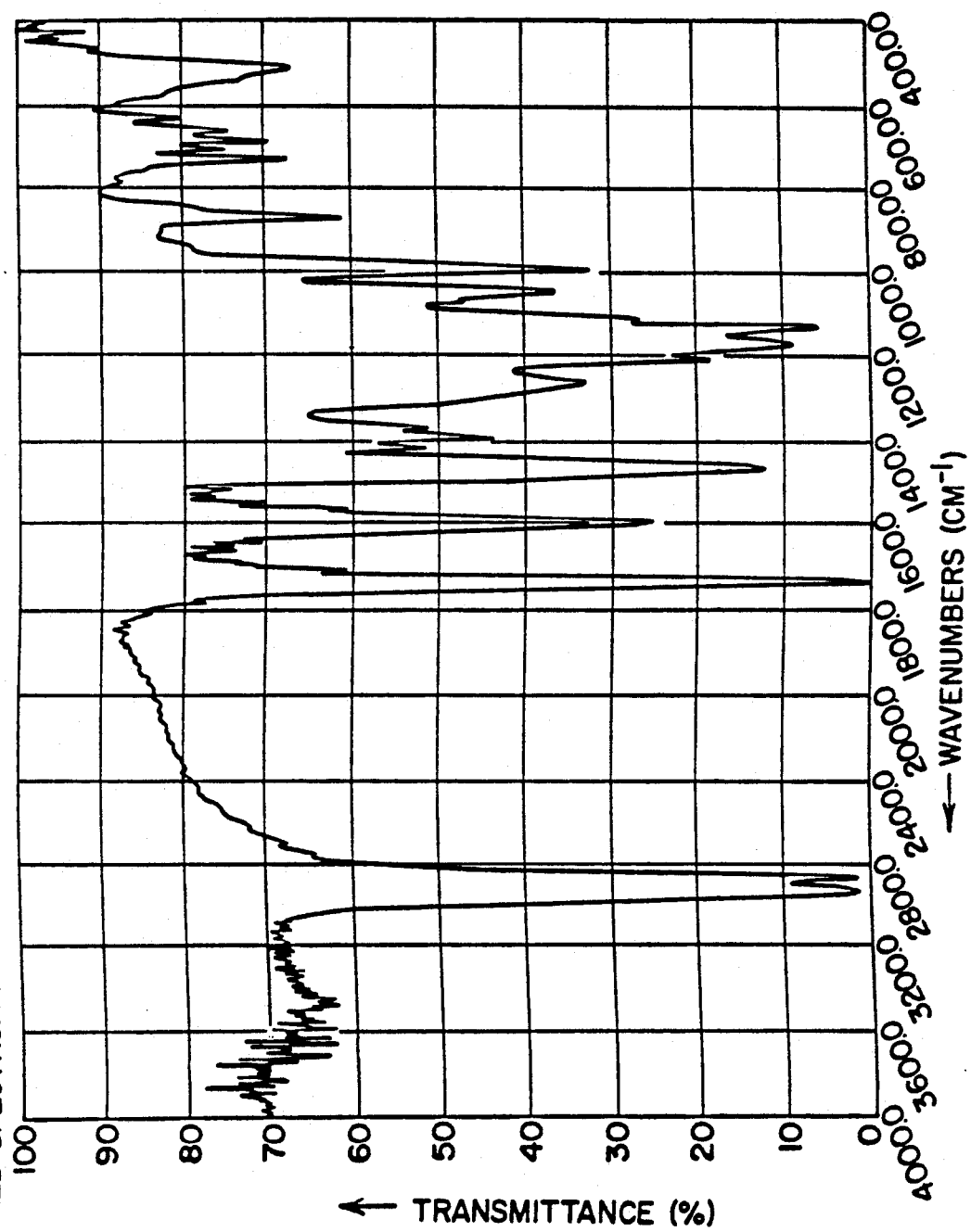
FIG. 11 is a graph of the infrared spectrum of the hydrogenated butadiene/2-methoxyethyl acrylate copolymer.

When the butadiene /2-methoxyethyl acrylate copolymer was hydrogenated as detailed in Example 16, 100 percent hydrogenation of the backbone and pendant unsaturation derived from butadiene was accomplished. The infrared spectrum of the starting material (FIG. 10) when compared with that of the hydrogenated product (FIG. 11), indicated the complete absence of the absorption at 970 cm$^{-1}$ due to the olefinic or unsaturated carbon-hydrogen out-of-plane bend of the trans 1,4 copolymerized butadiene unit and that at 915 cm$^{-1}$ due to the olefinic or unsaturated carbon-hydrogen out-of-plane bend resulting from butadiene copolymerized in a 1,2 manner. The pendant ester groups were not affected as the C=O stretching absorption at 1735 cm$^{-1}$ is retained in the hydrogenated product. Therefore, the polar character of the copolymer, and hence the oil-resistance, is retained in the hydrogenated copolymer.

Also, the hydrogenation catalyst formed from cobalt neodecanoate is more efficient than that formed from cobalt octoate as the transition metal component. This is related to the higher water content in the commercially available cobalt octoate solution (1.1 wt percent) than in cobalt neodecanoate (0.32 wt. percent).

In a third embodiment of the present invention, fluorine containing 1,3-dienes are copolymerized with hydrocarbon 1,3-dienes. Glass transition temperature and oil resistance are dependent upon the fluorine content. More specifically, the polar groups in the copolymer contribute to polymer oil-resistance while maintaining polymer thermooxidative stability. Generally, the unsaturation of copolymerized fluorinated 1,3-dienes is unaffected by the hydrogenation process. Thermooxidative stability is improved greatly by removal of carbon/carbon unsaturation derived from the hydrocarbon diene in the polymer, through hydrogenation. Thus, thermooxidatively stable oil-resistant polymers with good low temperature properties are obtained. The use of 1,3-butadiene as a comonomer yields strong elastomers due to stretch crystallizable polyethylene segments in the polymer that are formed by the hydrogenation process. The use of the relatively inexpensive hydrocarbon-based dienes help lower raw material costs.

A hydrogenated copolymer is prepared from at least two monomers. A copolymer is formed by emulsion polymerization and then hydrogenated to obtain a thermooxidatively stable composition. The copolymer is prepared from two monomer classes. The first monomer comprises a fluorodiene of the structure

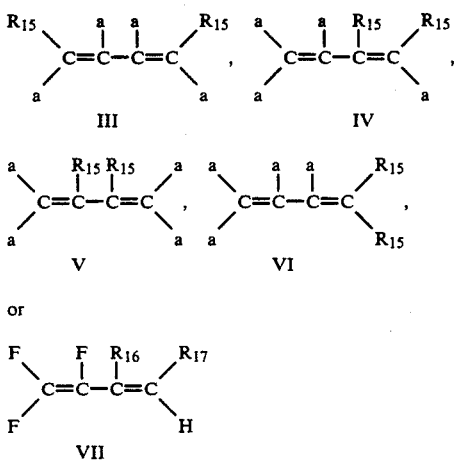

wherein substituent a is independently hydrogen or fluorine, $R_{15}$ is hydrogen or a fluoro alkyl group containing from 1 to about 4 carbon atoms and containing at least three fluoro atoms, with the proviso that both $R_{15}$ groups are not hydrogen, $R_{16}$ and $R_{17}$ are independently fluorine, hydrogen or a fluoro alkyl group containing from 1 to about 4 carbon atoms and containing at least three fluorine atoms.

The second monomer is (a) a hydrocarbon diene comprising a straight chain conjugated diene, a branched conjugated diene or mixtures thereof containing from 4 to about 8 carbon atoms, or a monomer (b), (b) being a monomer of the general formula $CH_2=CR_{18}X$ wherein $R_{18}$ is hydrogen or an alkyl group containing from 1 to about 4 carbon atoms, and X is 2-pyridyl, 4-pyridyl, —COOR$_{19}$, —CONR$_{20}R_{21}$ or —COOR$_{22}$OR$_{19}$ wherein $R_{19}$ is an alkyl group containing from 1 to about 4 carbon atoms, —CH$_2$CF$_3$ or —CH$_2$CF$_2$CF$_2$H, $R_{20}$ and $R_{21}$ are alkyl groups containing from 1 to about 4 carbon atoms, and $R_{22}$ is an alkylene group containing from 1 to about 4 carbon atoms. The second monomer may also comprise a mixture of monomers (a) and (b). The mole ratio of diene (a): $CH_2=CR_{18}X$ (b), when (b) is present, is from 1:7 to about 7:1 and wherein the mole ratio of first monomer:-second monomer is from about 4:3 to about 2:3.

The first monomer is a fluorodiene. Some representative examples of fluorodienes of the above structures III through VII are:

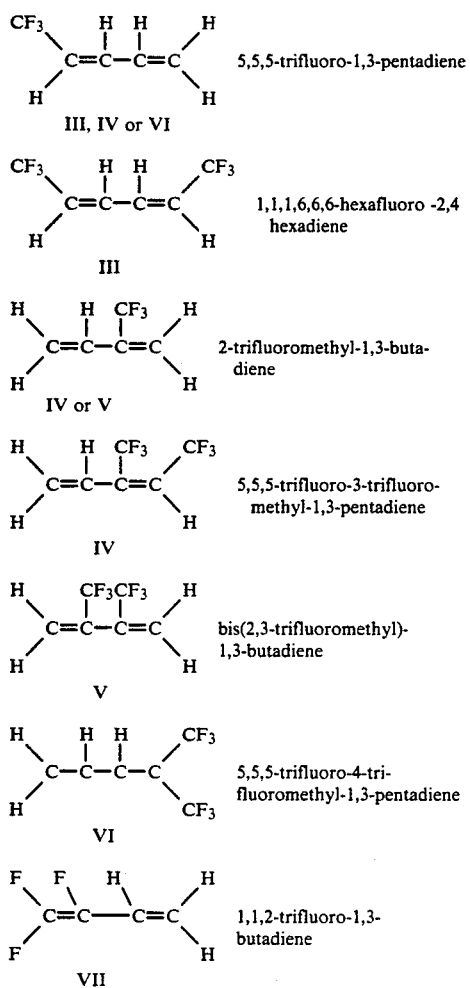

The term "fluoroalkyl" as used herein signifies that hydrogens of an alkyl group are replaced with fluorine. Structural examples of fluoro alkyl groups are: —CF₃, —CH₂CF₃, —CHFCHF₂, —CF₂CH₂F, —CHFCF₃, —CF₂CHF₂, —CF2CF₃, —CH₂CH₂CF₃, —CH₂CHFCHF₂, —CH₂CF₂CF₃, —CH₂CH₂CH₂CF₃, —CH₂CH₂CHFCHF₂, —CH₂CH₂CHFCF₃, —CH₂CH₂CF₂CF₃, —CH₂CH₂CHFCHF₂, —CH₂CH₂CHFCF₃. This list is intended to be merely illustrative and not exhaustive, and the omission of a certain structure is not meant to require its exclusion. Preferably the fluoro alkyl group contains from 1 to 2 carbon atoms and has at least three fluoro atoms. Preferable fluoro alkyl groups are —CF₃, —CH₂CF₃, —CF₂CF₃ or —CF₂CHF₂. The most preferable fluoro alkyl group is —CF₃.

One of the structural formulae III through VII is utilized as the first monomer and its disclosure above is hereby incorporated in toto. The second monomer is (a) a straight chain conjugated diene, a branched conjugated diene, or mixtures thereof containing from 4 to 8 carbon atoms. Examples of straight chain dienes are 1,3-butadiene, 1,3-pentadiene, 1,3-hexadiene, 1,4-hexadiene, 1,3-heptadiene, 2,4-heptadiene, 1,3-octadiene, 2,4-octadiene, and 3,5-octadiene. Some representative examples of branched chain dienes are isoprene, 2,3-dimethyl-1,3-butadiene, 2-methyl-1,3-hexadiene, 3methyl-1,3-hexadiene, 2-methyl-2,4-hexadiene, 3-methyl-2,4-hexadiene, 2,3-dimethyl-1,3-pentadiene, 2,4-dimethyl-1,3-pentadiene, 2-ethyl-1,3-pentadiene, and 3-ethyl-1,3-pentadiene. The preferred dienes for the practice of the invention are butadiene and isoprene.

The second monomer may also be (b), a monomer of the general formula CH₂=CR₁₈X wherein R₁₈ is hydrogen or an alkyl group containing from 1 to about 4 carbon atoms, and X is 2-pyridyl, 4-pyridyl, —COOR₁₉, —CONR₂₀R₂₁ or —COOR₂₂OR₁₉ wherein R₁₉ is an alkyl group containing from 1 to about 4 carbon atoms, —CH₂CF₃ or —CH₂CF₂CF₂H, R₂₀ and R₂₁ are alkyl groups containing from 1 to about 4 carbon atoms, and R₂₂ is an alkylene group containing from 1 to about 4 carbon atoms; or mixtures of diene (a) and CH₂=CR₁₈X (b), wherein the mole ratio of diene (a):CH₂=CR₁₈X (b), when (b) is present, is from 1:7 to about 7:1 and wherein the mole ratio of first monomer:second monomer is from about 4:3 to about 2:3.

Preferably R₁₈ is hydrogen or an alkyl group containing from 1 to 2 carbon atoms and most preferably R₁₈ is hydrogen or methyl. When X is —COOR₁₉, R₁₉ preferably is an alkyl group containing from to 2 carbon atoms, most preferably R₁₉ is methyl. When X is —CONR₂₀R₂₁, preferably R₂₀ and R₂₁ are alkyl groups independently containing from 1 to 2 carbon atoms and most preferably R₂₀ and R₂₁ are methyl. When X is —COOR₂₂OR₁₉, preferably R₂₂ is an alkylene group containing from 1 to about 2 carbon atoms and R₁₉ is an alkyl group containing from 1 to about 2 carbon atoms. When R₁₈ is hydrogen or methyl and X is —COOR₁₉, some examples of CH₂=CR₁₈X are acrylates, methacrylates, fluorinated acrylates, or fluorinated methacrylates When R₁₈ is hydrogen or methyl and X is —CONR₂₀R₂₁, CH₂=CR₁₈X may be tertiary acrylamides or tertiary methacrylamides. When R₁₈ is hydrogen or methyl and X is —COOR₂₂OR₁₉, some examples of CH₂=CR₁₈X are alkoxyalkyl acrylates or methacrylates.

When the second monomer comprises both (a) and (b), the mole ratio of diene (a): CH₂=CR₁₈X(b) is from about 1:7 to about 7:1, preferably 1:5 to about 5:1 and most preferably 3:1 to about 4:1.

The hydrogenated copolymers of the third embodiment of the present invention also have utility as high temperature oil-resistant elastomers. The hydrogenated copolymers of this third embodiment may be solids or liquids, depending on molecular weight. These hydrogenated copolymers serve as thermooxidatively stable oil-resistant elastomers or as impact modifiers for plastics. Products made from these elastomers find use for seals, gaskets, and hoses. The liquid polymers can be used as processing aids and/or modifiers in rubber and plastic compounding.

The first step in the preparation of an oil-resistant elastomer is in forming a copolymer. The copolymer is formed by emulsion polymerization. For the formation of the copolymer, the mole ratio of the first monomer:second monomer is from about 4:3, preferably 2:3, and most preferably 1:1.

The copolymer is made in a conventional manner. That is, the above-noted monomers are added to suitable amounts of water in a polymerization vessel along with one or more conventional ingredients and polymerized. The amount of polymerized solids or particles is generally from about 15 percent to about 50 percent with from about 25 to about 35 percent by weight being desired. The temperature of polymerization is generally from about 5° C. to about 80° C. with from about 5° C.

to about 20° C. being preferred. Typically in excess of 60 percent conversion is obtained with from about 80 percent to about 85 percent conversion being preferred. The copolymerization is generally initiated by free radical catalysts which are utilized in conventional amounts, with examples of such catalysts being those discussed above with regard to the first two embodiments of the present invention, which discussion is hereby fully incorporated by reference.

Inasmuch as the copolymers are prepared via an emulsion latex polymerization route, anionic emulsifying aids are utilized. Thus, various conventional anionic surfactants and anionic electrolytes known to the art as well as to the literature are utilized, with the discussion thereof with respect to the first two embodiments of the invention being hereby fully incorporated by reference.

Molecular weight modifiers are also utilized to maintain the molecular weight within desirable limits as otherwise the viscosity of the polymer would be exceedingly high for subsequent handling, processing, and the like. Generally, known conventional molecular weight modifiers can be utilized such as are discussed above with respect to the first two embodiments of the present invention, which discussion is hereby fully incorporated by reference.

Yet another conventional emulsion latex additive is various short stop agents which are added generally to stop the polymerization and to tie up and react with residual catalysts. Such agents are discussed above with respect to the first two embodiments of the invention and such discussion is hereby fully incorporated by reference.

A cationic coagulant polymer also is utilized in the third embodiment of the invention to coagulate the anionic emulsifying aids such as the various anionic surfactants and the various anionic electrolytes utilized, and the discussion thereof with respect to the first two embodiments of the present invention is hereby fully incorporated by reference.

The cationic polymeric coagulant treated copolymer latex of the third embodiment of the invention generally results in a slurry of rubber crumbs in a clear aqueous liquid. The crumbs contain the various anionic emulsifying aids physically incorporated therein. Such crumbs can be separated in any conventional manner as by filtering. Inasmuch as the anionic emulsifying aids have been rendered innocuous, multiple washing steps or other expensive, tedious process steps such as solvent extraction are not utilized.

The copolymer of the third embodiment of the present invention once dried as by conventional means, has improved properties such as good water resistance, good adhesion properties, non-interference with cure systems when cured, reduce fouling of molds during the manufacture of parts, improved electrical insulating properties, and the like. Such copolymers can accordingly be utilized as adhesives, that is polymeric adhesives, binders, films, e.g., electrical insulating films, coatings such as for electrical circuit boards along with other conventional coating additives and fillers known to the art and to the literature, and the like. Suitable adhesive uses include metal-to-metal adhesion, metal-to-fabric adhesion, metal-to-plastic adhesion, and the like. Additionally, the polymers of the third embodiment of this invention have utility in the automotive area such as in hoses, gaskets, seals, and timing belts.

The copolymer can be prepared with a mercaptan chain transfer agent composition comprising (a) at least one mercaptan chain transfer agent and optionally (b) at least one non-polymerizable material which is miscible with the mercaptan chain transfer agent. Suitable mercaptans include those discussed above with respect to the first two embodiments of the present invention, which discussion is hereby fully incorporated by reference.

The chain transfer composition may comprise, in addition to the mercaptan, at least one non-polymerizable material which is miscible with the mercaptan and is substantially insoluble in water, and the discussion thereof with regard to the first two embodiments of the present invention also is hereby fully incorporated by reference.

The molecular weight of the copolymers of the third embodiment of the present invention have a weight average molecular weight of from about 20,000 to about 1,000,000; desirably from about 200,000 to about 750,000; and preferably from about 400,000 to about 500,000.

The third embodiment of the present invention will be better understood by reference to the following examples.

Example 20 below outlines the emulsion polymerization of 1,1,2-trifluorobutadiene and butadiene.

EXAMPLE 20

Third Embodiment

To a 1 liter beverage bottle was added 121 g water. The water was deoxygenated by bubbling in nitrogen before mixing in any additional components. Added were 2.0 g 45 percent sodium lauryl sulfate emulsifier, 0.063 g sodium naphthalene sulfonate secondary emulsifier and 0.075 g sodium carbonate electrolyte. A magnetic stirrer bar was added to the bottle which was flushed with nitrogen and fitted with a septum. About 21.2 g 1,1,2-trifluoro-1,3-butadiene was generated per a procedure of J. Org. Chem., 53, 2304 (1988) and condensed directly into the cooled (dry ice/acetone) beverage bottle. About 10 g liquid butadiene was then injected into the bottle via syringe, and then 0.26 g t-dodecylmercaptan chain transfer agent was also injected and the contents were gradually allowed to warm up to 5° C. in an ice bath.

The following were freshly dissolved in 10 ml of deoxygenated water: About 0.0124 g sodium hydrosulfite oxygen scavenger, 0.0037 g trisodium ethylene diamine tetraacetate trihydrate complexing agent for iron ions, 0.0056 g sodium ferric ethylenediamine tetraacetate and 0.0391 g sodium formaldehyde sulfoxylate. One-half of this solution was injected into the beverage bottle followed by the introduction of 0.062 g paramenthane hydroperoxide initiator. After stirring for 4 hours at 5° C., the contents were allowed to gradually warm up to room temperature overnight.

After the bottle was vented 0.1 g hydroxyl ammonium sulfate short stop dissolved in 1 ml water was added to the latex and stirring was continued for 15 minutes before adding 1.2 g 40 percent Aquamix 115 antioxidant. Stirring was continued for 20 more minutes and the latex was coagulated in 70° C. water containing 1.5 weight percent of aluminum sulfate. The rubbery crumbs (90 percent yield) were washed with water and dried in air (70° C.), followed by vacuum drying at 60° C. and 1 mm Hg for 4 hours.

The cis and trans microstructures from the hydrocarbon diene generally are hydrogenated to linear polyethylene segments which are responsible for the improved mechanical properties of the elastomer due to stretch crystallinity (A. H. Weinstein, *Rubber Chemical Technology* 57, 203 (1984)).

The copolymer once obtained in the third embodiment of the invention as described above is then subjected to hydrogenation in the presence of a transition metal catalyst, trialkylaluminum, and a complexing the absence of $BF_3$ or $BF_3$ etherate.

Either a homogeneous or a heterogeneous catalyst may be used for the hydrogenation although a homogeneous catalyst is preferred. Since a homogeneous catalyst dissolves in solution, good contact is obtained with the high molecular weight random polymer or copolymer. The homogeneous catalysts are transition metal catalysts of either iron, cobalt, or nickel. These metals are present as halides, acetates, or acetylacetonates. Other homogeneous catalysts that can be employed are palladium, platinum or rhodium present as tetrakistriphenylphosphine palladium (0), tetrakistriphenylphosphine platinum (0) or tristriphenylphosphine rhodium chloride.

The transition metal catalyst is employed with trialkylaluminum compounds, wherein the alkyl group contains from 1 to about 4 carbon atoms, which functions as a reducing agent. Other reducing agents that can be employed are dialkyl aluminum hydride, the dialkyl aluminum alkoxides of 1 to 4 carbon atoms, sodium borohydride, and lithium aluminum hydride. Additionally, other reductants are alkyl lithium, dialkyl magnesium, and alkyl magnesium halide wherein the alkyl groups are from 1 to 4 carbon atoms, and the halide is chloride or bromide.

The mole ratio of transition metal catalyst: reducing agent is usually from 1:10, preferably 1:6, and most preferably from 1:4.

In accordance with one of the main features of the present invention, the transition metal catalyst complexes with a complexing agent. Without a complexing agent, addition of the catalyst to the polymer solution causes gelation. This is due to the metal ion of the transition metal catalyst complexing with the polar groups on the polymeric chains. A gelled polymer is difficult to hydrogenate to a high degree. Also, a partially crosslinked polymer results. These factors cause the elastomer to be poorer in heat aging and physical properties when compared to the polymers of this invention In the third embodiment of the present invention the complexing agents complex with the catalyst in order to prevent the catalyst from excessive bonding to the polar functionalities.

Thus, in accordance with one of the important features of the present invention, unexpectedly high degrees of hydrogenation of the copolymer unsaturated olefinic backbone have been achieved, which improves the heat resistance of the copolymer. Such unexpectedly good results have been achieved through the use of a complexing agent for the hydrogenation catalyst which prevents "poisoning" of the catalyst by the polar groups of the copolymer thereby enabling the catalyst to complex with unsaturated sites along the olefinic copolymer backbone to achieve such high levels of hydrogenation thereof. The degree of hydrogenation achieved in the third embodiment of the present invention is greater than about 80 percent; preferably greater than about 85 percent; and most preferably greater than 95 percent hydrogenation of the olefinic unsaturated backbone of the produced copolymers.

The amount of complexing agent employed is related to the relatively low catalyst level. Generally, the mole ratio of catalyst complexing agent is from 1:10, preferably 1:8; and most preferably 1:6. The complexing agents for the catalysts are hexamethylphosphoric triamide, tetramethylethylenediamine, phosphines of the general formula $(R_{23})_3P$, phosphites of the general formula $(R_{23})_3P$ wherein $R_{23}$ is an alkyl group containing from 1 to about 6 carbon atoms, a phenyl group or a substituted aromatic group wherein the substituent is an alkyl group containing from 1 to 2 carbon atoms such as o-tolyl.

Solvents for the hydrogenation are well known in the art. An exemplary list of solvents are xylenes, toluenes, anisole, dioxane, tetrahydrofuran, hydrocarbons such as hexanes, heptanes, and octanes and chlorinated hydrocarbons such as chlorobenzene and tetrachloroethane, trisubstituted amines such as triethylamine and tetramethylethylene diamine.

The temperature of hydrogenation is generally from about 25° C. to about 150° C. with from about 25° C. to about 50° C. being preferred.

Removal of the transition metal catalyst is difficult and expensive. This is due to the high molecular weight of the polymer and also that the catalyst is intimately associated with the polymer. A catalyst, when left in contact with the hydrogenated polymer, shows a degradative action. This action is discussed in a paper titled "Rule of Metals and Metal Deactivators in Polymer Degradation," Z. Osawa, *Polymer Degradation and Stability*, 20, 203 (1988). An approach of this invention was to remove the catalyst from the polymer and also to render the residual catalyst innocuous, that is, to deactivate the catalyst by the addition of a second complexing agent after hydrogenation in the absence of air. If the catalyst is not rendered innocuous, the polymer shows poor heat aging and high oil swell. Some examples of the second complexing agents are weak organic acids containing from 1 to about 4 carbon atoms such as formic acid, acetic acid, and propionic acid; diacids containing from 2 to about 6 carbon atoms such as oxalic acid, malonic acid, succinic acid, glutaric acid, and adipic acid; amino acids of to about 4 carbon atoms such as glycine, alanine, alphaglutaric acid, betaglutaric acid, and gammaglutaric acid; citric acid; pyridine or substituted pyridine wherein the substituent contains 1 to 2 carbon atoms; pyridine carboxylic acids such as nicotinic acid and the corresponding sodium or potassium salts; alkyl or aromatic nitriles containing from 1 to 6 carbon atoms; substituted ureas or thioureas such as N,N-dialkyldithiocarbamate metal salts of 1 to 4 carbon atoms wherein the metal is lithium, sodium, or potassium, hexamethylphosphoric triamide; tetramethylethylenediamine; phosphines $P(R_{24})_3$ and phosphites $P(OR_{24})_3$ wherein $R_{24}$ is aliphatic with 1 to 4 carbon atoms or aromatic such as $C_6H_5$, $C_6H_4CH_3$, naphthyl; olefins such as trans-1,2-dichloroethylene; inorganic salts such as iodides, cyanides, isocyanates, thiocyanates, thiocyanides, sulfides, hydrosulfides wherein the metals are sodium or potassium; and hydrogen sulfide as well as any mixtures thereof. A preferred second complexing agent is a solution of acetic acid and pyridine in a weight ratio of from about 7:1 to about 4:1 and most preferably of from about 6:1 to about 5:1.

Previously employed methods for catalyst removal have dealt with coagulation of the polymer solution in dilute aqueous inorganic acid and/or addition of polar organic solvents such as alcohols, ketones, or hot water/steam. When this approach was tried in the present invention, the product obtained still contained appreciable quantities of catalyst resulting in poor heat aging and high oil swell. The use of dilute aqueous inorganic acids for the present invention resulted in a product with embrittlement.

EXAMPLE 21

Third Embodiment

Under nitrogen, 15 grams of the product of Example 20 was dissolved in several portions in 300 ml dry tetrahydrofuran in a 500 ml three-necked round bottom flask equipped with a magnetic stirring bar. The copolymer was completely dissolved in about four hours.

Preparation of the Hydrogenation Catalyst Solution

Under nitrogen, a solution of 1.6 grams 12 weight percent) of cobalt (II) neodecanote in mineral spirits and 3.5 grams hexamethylphosphoric triamide was prepared and cooled by means of an ice bath to about 3° C. To this purple solution was added, drop-wise, 6.4 ml of triethylaluminum (25 weight percent, 1.9 molar solution) in toluene. Evolution of gases occurred and the purple solution turned brown upon the addition of the triethylaluminum. After the addition of the triethylaluminum solution, a hydrogenation catalyst solution was stirred under nitrogen for 1.5 hours at room temperature.

The hydrogenation catalyst was then added slowly to the stirred copolymer solution. The copolymer solution was then transferred under nitrogen into an 800 ml pressure vessel, followed by the introduction of hydrogen (500 psi). Periodically, the reactor was repressurized to 500 psi in order to compensate for hydrogen uptake by the copolymer. When hydrogen uptake at room temperature ceased, the copolymer solution was heated to 50° C. and the hydrogen pressure increased to 1000 psi. Again, repressurization was continued to compensate for hydrogen uptake by the copolymer. After a total time of about six hours, hydrogen uptake stopped. The copolymer solution was then cooled to room temperature. Excess hydrogen was vented and replaced with a nitrogen blanket. A solution of glacial acetic acid (30 ml) and pyridine (1 ml), deoxygenated by bubbling in nitrogen, was then added under nitrogen to the copolymer solution. After shaking for one hour at room temperature, the copolymer solution was coagulated in hot (70° C.) water, filtered and dried in air (100° C., four hours), followed by drying in vacuum (80° C., 1 mm Hg, two hours).

The action of the acetic acid/pyridine solution on the cobalt ions under anaerobic conditions was important in rendering the residual cobalt catalyst (intimately mixed in with the polymer) innocuous to polymer degradation. Without this treatment, the hydrogenated polymer exhibits poor heat aging and high oil swell in hydrocarbon oils. When acetic acid/pyridine solution is added to the solution of the hydrogenated polymer in the presence of air, prior to polymer coagulation, heat aging is not improved.

It is well known to the art and to the literature that polymers and copolymers based solely on fluorine containing 1,3-carbodienes yield heat-resistant polymers if the number of fluorine atoms attached directly to the carbon backbone is greater than 1. Heat resistance may vary depending upon the point of attachment of the fluorine atom to the carbon backbone, but in general, the higher the fluorine content, the higher the thermooxidative stability of the polymer. In addition, the presence of polar —C—F bonds in these polymers makes them oil-resistant. However, such polymers are normally resinous and, hence, are not suitable for low temperature (e.g., −30° C.) elastomer applications. This is the case, for example, with the homopolymer of 1,1,2-trifluorobutadiene Such resinous materials are used primarily in fiber and coating applications. Thus, although there has been a long-felt commercial need for polymers which are useful in low temperature (e.g., −30° C.) elastomeric applications, and which exhibit good thermooxidative stability or heat resistance and oil resistance, the above-discussed polymers and copolymers based solely on fluorine containing 1,3-carbodienes are of limited usefulness in such applications due to their relatively stiff resinous nature despite their good heat and oil-resistant properties. (See U.S. Pat. Nos. 2,979,489 and 3,218,303; and Technical Report 68-56-CM, particularly page 8 thereof, by Relyea, Smith and Johnson, February, 1968, Clothing and Organic Materials Laboratory, U.S. Army Natick Laboratories, Natick, Mass. 01760).

On the other hand, copolymers of fluorinated 1,3-dienes with hydrocarbon 1,3-dienes are suitable for low temperature (e.g., −30° C.) elastomeric applications. However, the heat resistance of these polymers is relatively poor due to the presence of the hydrocarbon segments containing carbon-carbon unsaturation sites, thus making these copolymers unsuitable for use in the area of above-described, long-felt commercial need. For example, the copolymer of 1,1,2-trifluorobutadiene and butadiene displays good low temperature elastomeric properties and oil resistance, but poor heat resistance. (See Technical Report 68-56-CM by Relyea, Smith and Johnson referenced above).

It is also well known to the art and to the literature that acrylonitrile/1,3-butadiene copolymers exhibit improved heat resistance or thermooxidative stability when the carbon-carbon unsaturation sites of the butadiene segments are saturated. (See European Patent Application No. 0 111 412).

It is further known to the art and to the literature that fluorinated 1,3-dienes copolymerize with hydrocarbon 1,3 dienes in a 1,4 configuration. Thus, a 1,1,2-trifluorobutadiene/butadiene copolymer such as is utilized as a starting material in the present invention is best represented as follows by general Formula $D_u$:

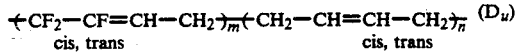

However, a tetrahydrofuran solution containing a hydrogenation catalyst and a 1,1,2-trifluorobutadiene/butadiene copolymer such as described above, becomes viscous and cannot be hydrogenated due to the drawing together of the —CF=CH— units of two different polymer chains, that is, due to crosslinking of the polymer chains which is mediated by the hydrogenation catalyst contained in the solution. Although polybutadiene by itself does not exhibit this effect because it is not polar enough to draw the catalyst in the same manner that the trifluorobutadiene polymer does, such crosslinking between the trifluorobutadiene segments of different polymer chains effectively prevents hydrogenation of the unsaturation sites in the butadiene segments of the polymer chains, which saturation is necessary for producing a high temperature, oil-resistant elastomer of the type which has been commercially sought after. Complete or even partial saturation or hydrogenation of such copolymers is unknown to the art and to the literature.

In accordance with the present invention, the addition of a first complexing agent to the tetrahydrofuran solution containing the 1,1,2-trifluorobutadiene/butadiene copolymer and hydrogenation catalyst prior to hydrogenation, complexes with the catalyst and prevents excessive complexing with the —CF=CH— units of the 1,1,2-trifluorobutadiene segments of the copolymer, so that the above-described crosslinking between different polymer chains does not occur and a low viscosity solution containing the copolymer results. Thus, the complexed catalyst is more mobile and can reach, together with hydrogen, the desired sites of unsaturation in the butadiene segments of the copolymer, enabling hydrogenation or saturation to take place to a high degree. The commercially sought after, high-temperature, oil-resistant elastomer composition of the present invention thus is produced.

It should be noted that the unsaturation present in the trifluorobutadiene segments of the 1,1,2-trifluorobutadiene/butadiene copolymer is not critical to the production of a high-temperature, oil-resistant elastomer composition of the present invention. More specifically, such unsaturation in the trifluorobutadiene segments is not detrimental to the overall thermooxidative stability of the copolymer of the invention due to the presence of the fluorine substituents in the 1,1,2-trifluorobutadiene segments.

A 1,1,2-trifluorobutadiene/butadiene copolymer was synthesized in emulsion with an equimolar ratio of the two monomeric components. Subsequent to polymerization, a single Tg, rather than two Tg's, was observed at −45° C. which indicates that a true copolymer was produced. From the proton magnetic resonance spectrum of the isolated polymer in tetrahydrofuran-d8 as shown in attached FIG. 13, it appears that both of the monomers were incorporated into the polymer in the same ratio. In keeping with the expected predominance of polymerization in a 1,4 fashion for both monomers, the representation of the polymer structure would be as follows in general Formula $D_u'$.

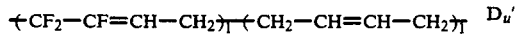

Figure 12:
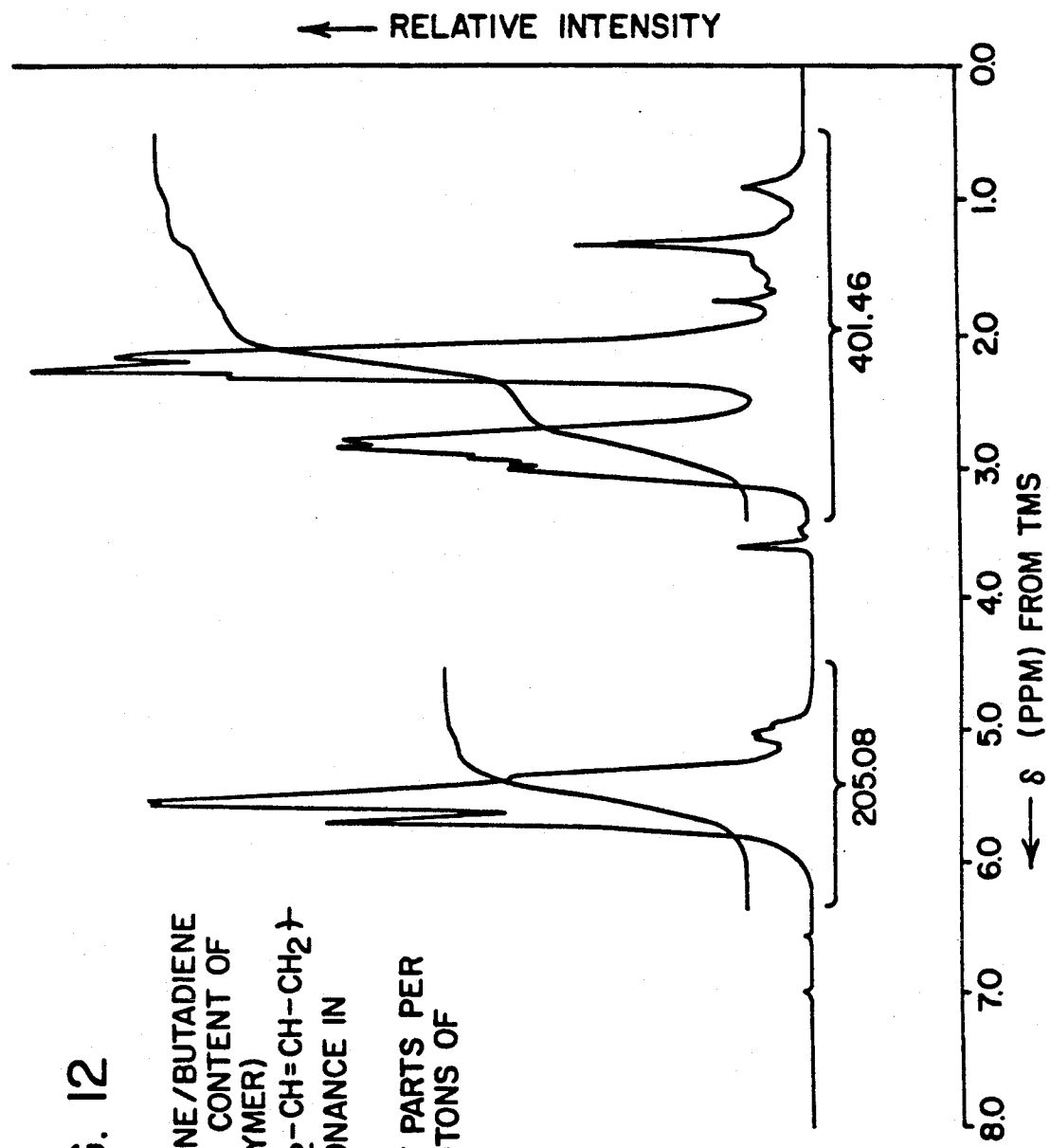
FIG. 12 is a graph of the proton magnetic resonance spectrum of the unhydrogenated 1,1,2-trifluorobutadiene/1,3-butadiene copolymer.

The ratio of aliphatic protons to vinyl protons expected is 6:3 or 2:1, which is observed in the attached spectrum in FIG. 12. Stated another way, the portion of the graph which is bracketed and extends from about 0.4 ppm to about 3.4 ppm represents the aliphatic protons or hydrogen atoms (i.e., 6 in number) which are attached to saturated carbons in the copolymer. The portion of the graph of from about 4.4 ppm to about 6.3 ppm represents vinyl protons or hydrogen atoms (i.e., 3 in number) attached to unsaturated carbon atoms of the copolymer. The area underneath the respective portions of the graph represented by the vertically oriented numbers 401.46 and 205.08, is directly proportional to the number of hydrogen atoms which are attached to saturated or unsaturated carbon atoms, respectively, in the synthesized copolymer.

The hydrogenated copolymer of the present invention is a mixture of the structures described as Formulas $D_h$ and $D_h$, below:

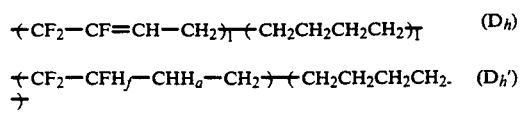

Figure 13:
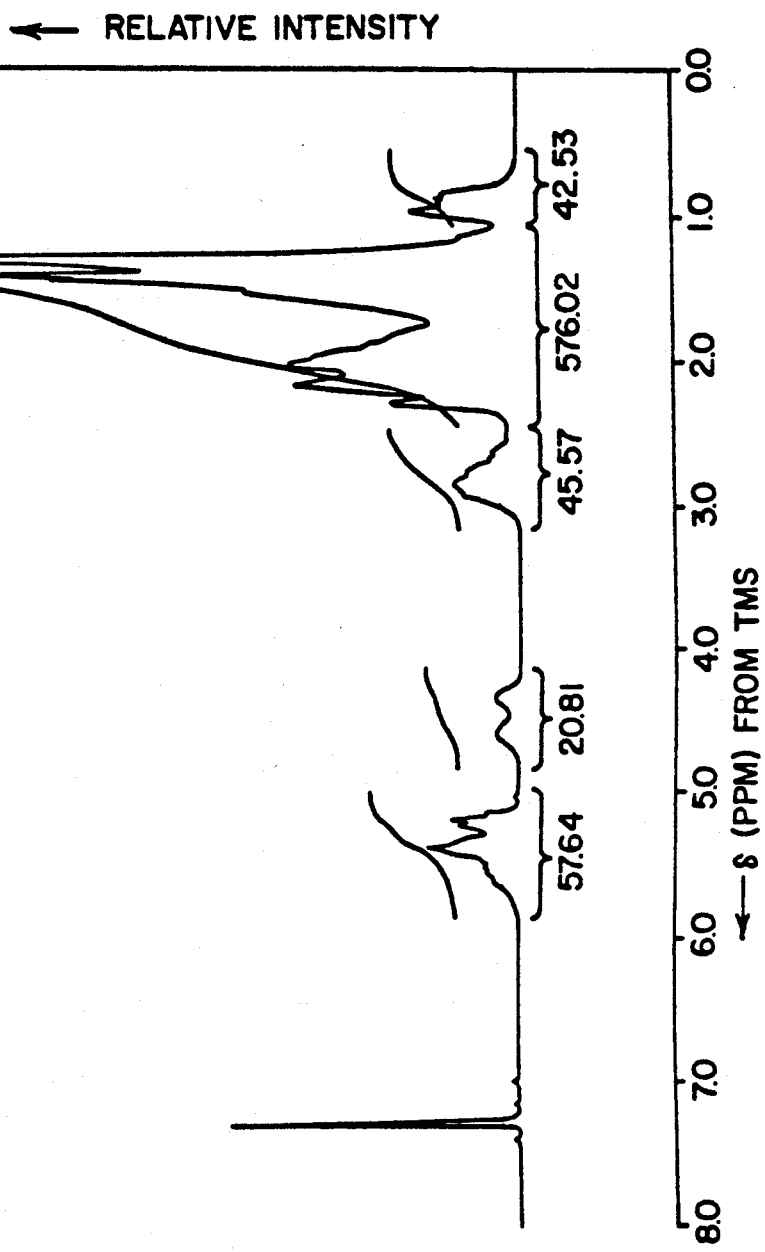
FIG. 13 is a graph of the proton magnetic resonance spectrum of the hydrogenated 1,1,2-trifluorobutadiene/butadiene copolymer.

The proton magnetic resonance spectrum of the hydrogenated copolymer of the present invention, as shown in attached FIG. 13, exhibits a decrease in the vinyl protons or hydrogen atoms attached to unsaturated carbon atoms of the copolymer, and an increase in the aliphatic protons or hydrogen atoms attached to saturated carbons of the copolymer. This fact is evident by viewing the peaks of FIG. 13 and comparing the same to the peaks of FIG. 12, and also by summing the vertically oriented numbers under the graph peaks, which represent the area under the respective peaks and is directly proportional to the number of hydrogen atoms attached to saturated carbon atoms and unsaturated carbon atoms in the copolymer.

The ratio of aliphatic protons to vinyl protons in the structure of Formula $D_h$ should be 10:1, which is an increase from the 6:3 ratio observed in the unhydrogenated starting copolymer, and the structure of $D_h'$ should be completely hydrogenated. The ratio of aliphatic to vinyl protons observed in the hydrogenated copolymer of the present invention, which is a mixture of structures $D_h$ and $D_h'$ is 11.8:1, indicating, in all probability, 100 percent hydrogenation of the unsaturation derived from the butadiene segment of the copolymer and partial hydrogenation of the unsaturation derived from the fluorinated diene segment of the copolymer. Thus, the high temperature, oil-resistant elastomer of the present invention is obtained as evidenced in FIG. 13. It should be noted that the new absorption from 4.1 to 4.8 ppm in FIG. 13 is assigned to the proton H$_f$ resulting from the partial hydrogenation of the —CF=CH— linkage in the trifluorobutadiene segment of the copolymer.

While in accordance with the Patent Statutes, the best mode and preferred embodiment has been set forth, the scope of the invention is not limited thereto, but rather by the scope of the attached claims.

What is claimed is:

1. A heat and oil-resistant hydrogenated elastomer composition, comprising:
   a copolymer including first and second monomeric classes, wherein said first monomeric class is a polar fluorodiene having the general formula

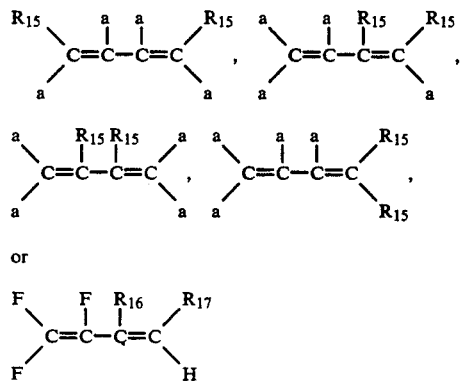

or wherein a is independently hydrogen or fluorine, $R_{15}$ is hydrogen or a fluoro alkyl group containing from about 1 to about 4 carbon atoms and at least 3 fluoro atoms, with the proviso that both $R_{15}$ groups are not hydrogen, and $R_{16}$ and $R_{17}$ are independently fluorine, hydrogen, or a fluoro alkyl group containing from about 1 to about 4 carbon atoms and at least 3 fluorine atoms, and wherein said second monomeric class is (a) a conjugated diene, a branched conjugated diene, or a mixture thereof containing from about 4 to about 8 carbon atoms, or (b) a monomer of the general formula $CH_2=CR_{18}X$ wherein $R_{18}$ is hydrogen or an alkyl group containing from about 1 to about 4 carbon atoms and X is 2-pyridyl, 4-pyridyl, $-COOR_{19}$, $-CONR_{20}R_{21}$ or $-COOR_{22}OR_{19}$ wherein $R_{19}$ is an alkyl group containing from about 1 to about 4 carbon atoms, $-CH_2CF_3$ or $-CH_2CF_2CF_2H$, $R_{20}$ and $R_{21}$ are alkyl groups independently containing from about 1 to about 4 carbon atoms and $R_{22}$ is an alkylene group containing from about 1 to about 4 carbon atoms, or mixtures of (a) and (b) wherein the mole ratio of (a):(b) is from about 1:7 to about 7:1, wherein the mole ratio of said first monomer to said second monomer is from about 2:3 to about 4:3 wherein the weight average molecular weight of said copolymer is from about 20,000 to about 1,000,000, and wherein the degree of hydrogenation of said copolymer is greater than about 80 percent.

2. The composition of claim 1, wherein said conjugated diene is butadiene or isoprene; wherein $R_{18}$ is hydrogen or an alkyl group containing 1 to 2 carbon atoms, $R_{19}$ is an alkyl group containing 1 to 2 carbon atoms, $R_{20}$ and $R_{21}$ are alkyl groups independently containing 1 to 2 carbon atoms, and $R_{22}$ is an alkylene group containing 1 to 2 carbons atoms; wherein the mole ratio of (a):(b) is from about 1:5 to about 5:1; wherein the weight average molecular weight of said copolymer is from about 200,000 to about 750,000; and wherein the degree of hydrogenation of said copolymer is greater than about 85 percent.

3. The composition of claim 2, wherein $R_{18}$ is hydrogen or a methyl group, $R_{19}$ is a methyl group, and $R_{20}$ and $R_{21}$ are a methyl group forming a butadiene/1,1,2-trifluorobutadiene copolymer; wherein the weight percent of the trifluorobutadiene monomer is about 67 percent based on the total weight of said copolymer; wherein the mole ratio of (a):(b) is from about 3:1 to about 4:1, wherein the mole ratio of said first monomer: said second monomer is 1:1; wherein the weight average molecular weight of said copolymer is from about 400,000 to about 500,000; and wherein the degree of hydrogenation of said copolymer is greater than about 95 percent.

* * * * *